US012689497B2

(12) United States Patent
Abdelghaffar et al.

(10) Patent No.: US 12,689,497 B2
(45) Date of Patent: Jul. 21, 2026

(54) MANAGING DOWNLINK AND UPLINK SWITCHING FOR SUB-BAND FULL DUPLEX

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Heechoon Lee, San Diego, CA (US); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 18/581,258

(22) Filed: Feb. 19, 2024

(65) Prior Publication Data

US 2025/0266976 A1 Aug. 21, 2025

(51) Int. Cl.
| | |
|---|---|
| *H04L 5/14* | (2006.01) |
| *H04W 72/0446* | (2023.01) |
| *H04W 72/51* | (2023.01) |

(52) U.S. Cl.
CPC .......... *H04L 5/14* (2013.01); *H04W 72/0446* (2013.01); *H04W 72/51* (2023.01)

(58) Field of Classification Search
CPC ...... H04L 5/14; H04W 72/0446; H04W 72/51
See application file for complete search history.

(56) References Cited

U.S. PATENT DOCUMENTS

| | | | | |
|---|---|---|---|---|
| 2022/0377843 A1* | 11/2022 | Zhang | ................... | H04W 88/06 |
| 2023/0318797 A1* | 10/2023 | Ibrahim | ................... | H04L 5/14 |
| | | | | 370/277 |

| | | | | |
|---|---|---|---|---|
| 2024/0049200 A1* | 2/2024 | Zhang | ................... | H04L 5/1469 |
| 2024/0056280 A1* | 2/2024 | Zhang | ................... | H04W 72/04 |
| 2024/0097867 A1* | 3/2024 | Zhang | ................... | H04L 5/0058 |
| 2024/0154780 A1* | 5/2024 | Abdelghaffar | ........ | H04L 5/1469 |
| 2024/0155583 A1* | 5/2024 | Rudolf | ................... | H04L 5/14 |
| 2024/0340153 A1* | 10/2024 | Zhang | ............... | H04W 72/0446 |
| 2025/0097902 A1* | 3/2025 | Zhang | ............... | H04W 72/1263 |

OTHER PUBLICATIONS

3GPP TR 38.858: "3rd Generation Partnership Project, Technical Specification Group Radio Access Network, Study on Evolution of NR Duplex Operation(Release 18)", 3GPP TR 38.858 V18.0.0, Dec. 2023, 255 pages (see Clause 6.1.1, pp. 17-18).
3GPP TS 38.213: "3rd Generation Partnership Project, Technical Specification Group Radio Access Network, NR, Physical Layer Procedures for Control (Release 18)", 3GPP TS 38.213, V18.1.0, Dec. 2023, 298 pages (see pp. 166-189).

* cited by examiner

*Primary Examiner* — Kenny S Lin

(74) *Attorney, Agent, or Firm* — Holland & Hart LLP

(57) ABSTRACT

Methods, systems, and devices for wireless communication are described. A user equipment (UE) may transmit an indication of a capability of the UE, the capability associated with a threshold quantity of switching events supported by the UE within a time period comprising one or more sub-band full duplex slots, where the switching events correspond to the UE switching between operating in a reception mode and operating in a transmission mode. The UE may receive scheduling for one or more messages, the one or more messages scheduled for communication during the time period in accordance with the capability of the UE. The UE may communicate the one or more messages with a network entity based at least in part on receiving the scheduling.

30 Claims, 16 Drawing Sheets

510

520

515

505

500

130      105      115

Network Entity

Transceiver

Antenna

1210

1215

Communications Manager

Memory

Code

1230

1220

1225

1240

Processor

1235

1205

1200

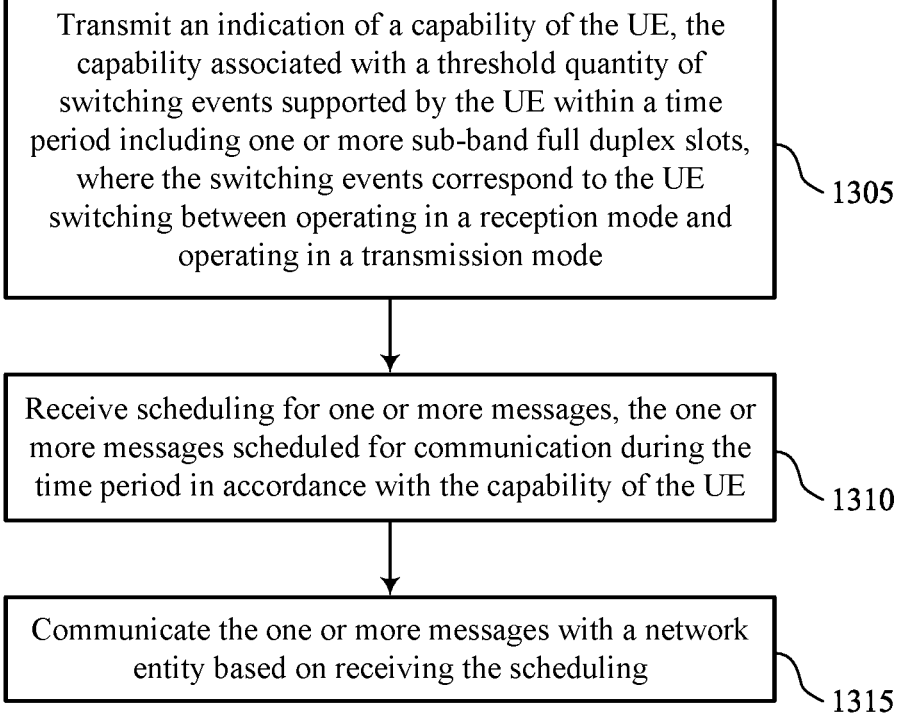

Transmit an indication of a capability of the UE, the capability associated with a threshold quantity of switching events supported by the UE within a time period including one or more sub-band full duplex slots, where the switching events correspond to the UE switching between operating in a reception mode and operating in a transmission mode

1305

Receive scheduling for one or more messages, the one or more messages scheduled for communication during the time period in accordance with the capability of the UE

1310

Communicate the one or more messages with a network entity based on receiving the scheduling

Figure 14:
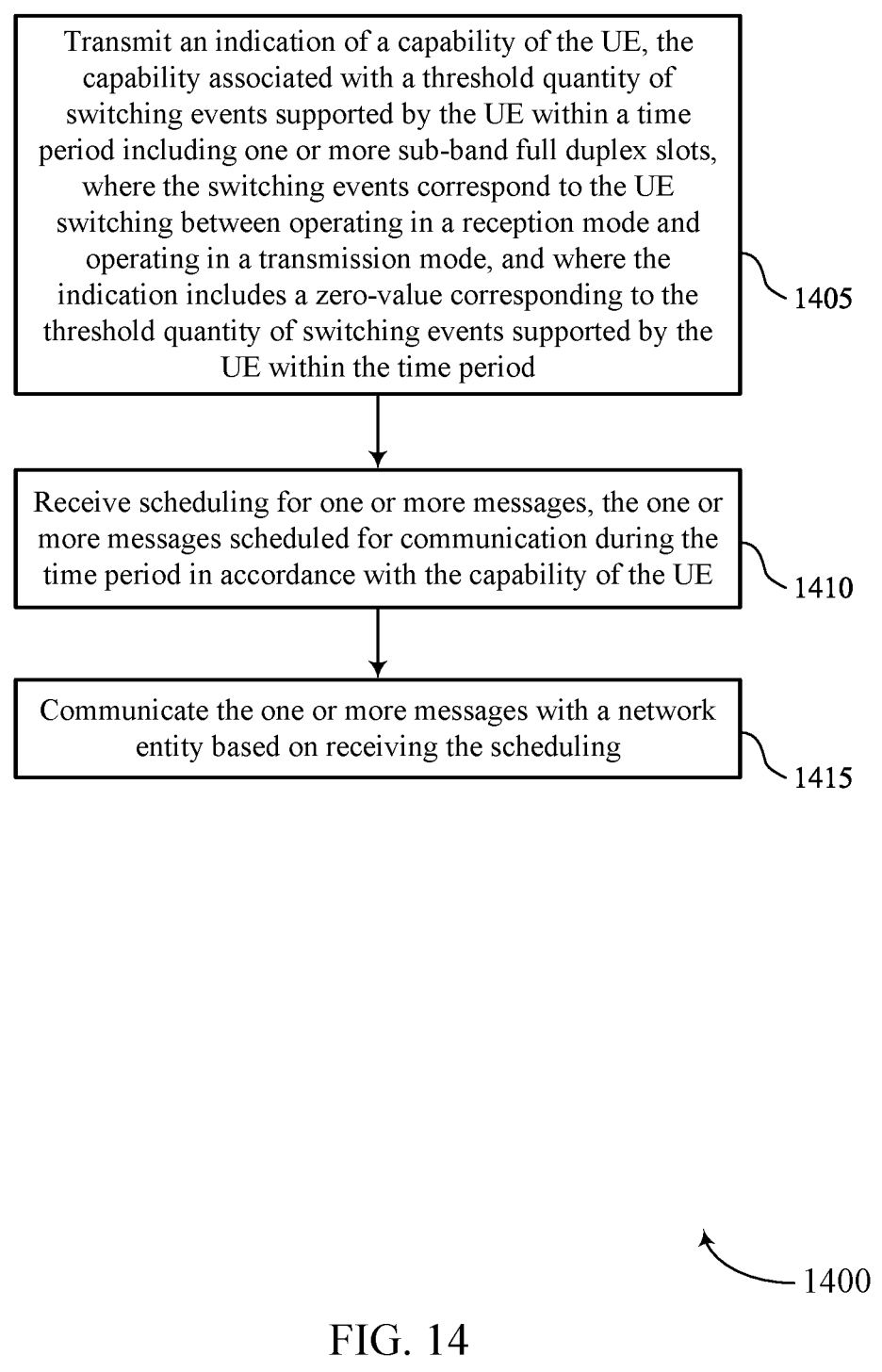

Transmit an indication of a capability of the UE, the capability associated with a threshold quantity of switching events supported by the UE within a time period including one or more sub-band full duplex slots, where the switching events correspond to the UE switching between operating in a reception mode and operating in a transmission mode, and where the indication includes a zero-value corresponding to the threshold quantity of switching events supported by the UE within the time period

1405

Receive scheduling for one or more messages, the one or more messages scheduled for communication during the time period in accordance with the capability of the UE

1410

Communicate the one or more messages with a network entity based on receiving the scheduling

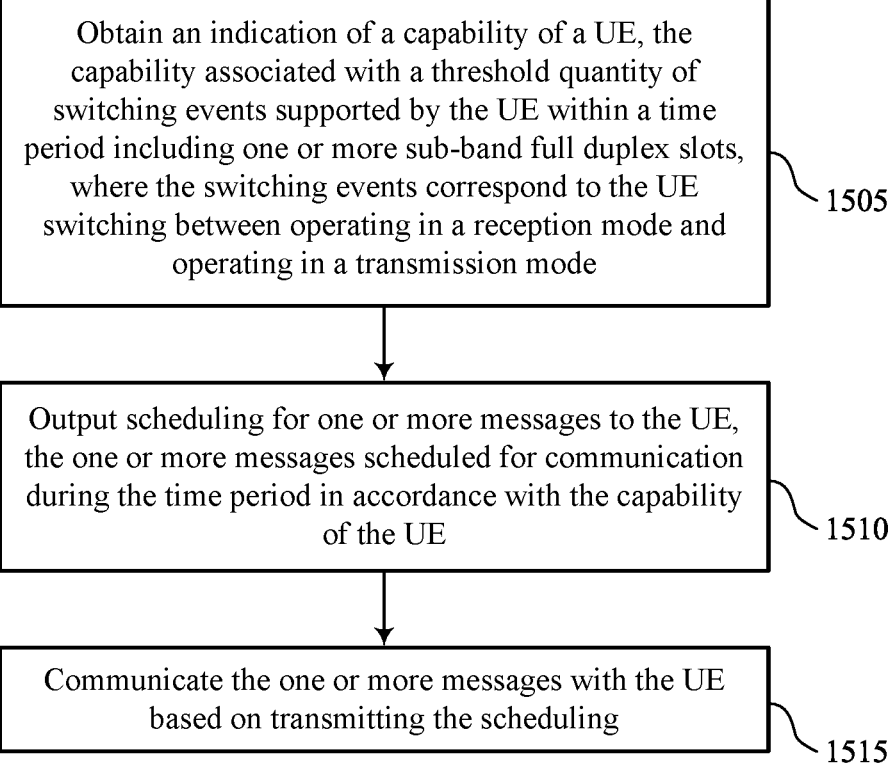

Obtain an indication of a capability of a UE, the capability associated with a threshold quantity of switching events supported by the UE within a time period including one or more sub-band full duplex slots, where the switching events correspond to the UE switching between operating in a reception mode and operating in a transmission mode

1505

Output scheduling for one or more messages to the UE, the one or more messages scheduled for communication during the time period in accordance with the capability of the UE

1510

Communicate the one or more messages with the UE based on transmitting the scheduling

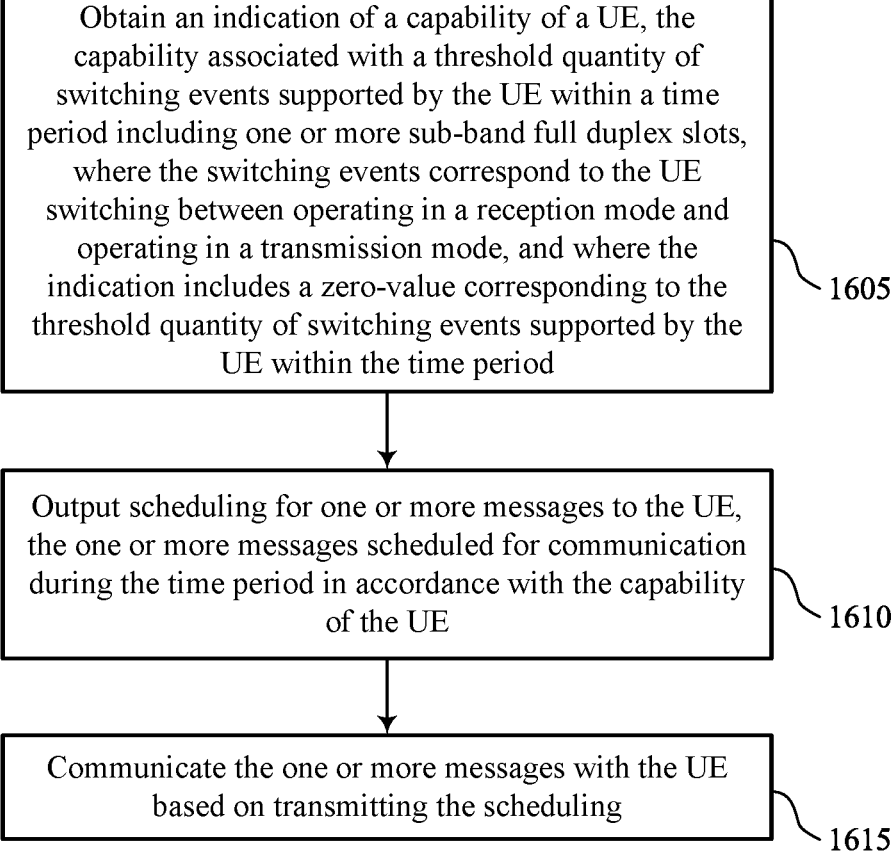

Obtain an indication of a capability of a UE, the capability associated with a threshold quantity of switching events supported by the UE within a time period including one or more sub-band full duplex slots, where the switching events correspond to the UE switching between operating in a reception mode and operating in a transmission mode, and where the indication includes a zero-value corresponding to the threshold quantity of switching events supported by the UE within the time period

1605

Output scheduling for one or more messages to the UE, the one or more messages scheduled for communication during the time period in accordance with the capability of the UE

1610

Communicate the one or more messages with the UE based on transmitting the scheduling

MANAGING DOWNLINK AND UPLINK SWITCHING FOR SUB-BAND FULL DUPLEX

FIELD OF TECHNOLOGY

The following relates to wireless communication, including quantity of downlink and uplink switching for sub-band full duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). To operate in a communication system, a UE may often switch between receiving messages from a base station while operating in a reception mode and transmitting message to a base station or other devices while operating in a transmission mode.

SUMMARY

The described techniques relate to improved methods, systems, devices, and apparatuses that support an indication of a quantity of downlink and uplink switching. For example, the described techniques provide for a UE to transmit an indication of a capability of the UE associated with a threshold quantity (e.g., a maximum quantity) of supported switching events by the UE within a time period. In some examples, the capability may define the threshold quantity of switching events within a sub-band full duplex (SBFD) pattern (e.g., containing one or more SBFD slots), within a time division duplex (TDD) pattern, such as a TDD-downlink-uplink (TDD-DL-UL) pattern, within a single SBFD slot, or within a mixed slot having SBFD and non-SBFD (e.g., TDD) symbols. In some cases, the switching events may include events where the UE switches from operating in a reception mode (e.g., a downlink mode) to operating in a transmission mode (e.g., an uplink mode), while switching from the transmission mode to the reception mode may not be counted. In some other examples, switching from the transmission mode to the reception mode may be counted as a switching event, for example, based on a guard period being used between an uplink symbol and a downlink symbol. As such, a network entity may perform scheduling for the UE in accordance with the threshold quantity of supported switching events, which may improve communication throughput in accordance with the capability of the UE.

A method for wireless communications by a UE is described. The method may include transmitting an indication of a capability of the UE, the capability associated with a threshold quantity of switching events supported by the UE within a time period including one or more SBFD slots, where the switching events correspond to the UE switching between operating in a downlink mode and operating in an uplink mode, receiving scheduling for one or more messages, the one or more messages scheduled for communication during the time period in accordance with the capability of the UE, and communicating the one or more messages with a network entity based on receiving the scheduling.

A UE for wireless communications is described. The UE may include one or more memories storing processor executable code, and one or more processors coupled with the one or more memories. The one or more processors may individually or collectively be operable to execute the code to cause the UE to transmit an indication of a capability of the UE, the capability associated with a threshold quantity of switching events supported by the UE within a time period including one or more SBFD slots, where the switching events correspond to the UE switching between operating in a downlink mode and operating in an uplink mode, receive scheduling for one or more messages, the one or more messages scheduled for communication during the time period in accordance with the capability of the UE, and communicate the one or more messages with a network entity based on receiving the scheduling.

Another UE for wireless communications is described. The UE may include means for transmitting an indication of a capability of the UE, the capability associated with a threshold quantity of switching events supported by the UE within a time period including one or more SBFD slots, where the switching events correspond to the UE switching between operating in a downlink mode and operating in an uplink mode, means for receiving scheduling for one or more messages, the one or more messages scheduled for communication during the time period in accordance with the capability of the UE, and means for communicating the one or more messages with a network entity based on receiving the scheduling.

A non-transitory computer-readable medium storing code for wireless communications is described. The code may include instructions executable by one or more processors to transmit an indication of a capability of the UE, the capability associated with a threshold quantity of switching events supported by the UE within a time period including one or more SBFD slots, where the switching events correspond to the UE switching between operating in a downlink mode and operating in an uplink mode, receive scheduling for one or more messages, the one or more messages scheduled for communication during the time period in accordance with the capability of the UE, and communicate the one or more messages with a network entity based on receiving the scheduling.

In some examples of the method, UEs, and non-transitory computer-readable medium described herein, a quantity of switching events for the scheduled one or more messages includes less than or equal to the threshold quantity of switching events based on transmitting the indication of the capability.

In some examples of the method, UEs, and non-transitory computer-readable medium described herein, the time period corresponds to a SBFD pattern including the one or more SBFD slots.

In some examples of the method, UEs, and non-transitory computer-readable medium described herein, the capability may be associated with a second threshold quantity of switching events supported by the UE within each SBFD slot of the time period.

In some examples of the method, UEs, and non-transitory computer-readable medium described herein, transmitting the indication of the capability may include operations, features, means, or instructions for transmitting an indication of a non-zero value corresponding to the threshold quantity of switching events supported by the UE within the time period and an indication of a zero value corresponding to the second threshold quantity of switching events supported by the UE within each SBFD slot based on switching events being supported by the UE between SBFD slots.

In some examples of the method, UEs, and non-transitory computer-readable medium described herein, the time period includes a TDD-DL-UL pattern including the one or more SBFD slots and one or more TDD slots.

In some examples of the method, UEs, and non-transitory computer-readable medium described herein, the time period includes a mixed slot having one or more SBFD symbols and one or more TDD symbols.

In some examples of the method, UEs, and non-transitory computer-readable medium described herein, the time period corresponds to one SBFD slot.

In some examples of the method, UEs, and non-transitory computer-readable medium described herein, a quantity of switching events for the scheduled one or more messages includes a first count of supported switching events corresponding to the UE switching from operating in the downlink mode to operating in the uplink mode, the quantity of switching events satisfying the threshold quantity of switching events.

In some examples of the method, UEs, and non-transitory computer-readable medium described herein, the quantity of switching events for the scheduled one or more messages further includes a second count of supported switching events corresponding to the UE switching from operating in the uplink mode to operating in the downlink mode.

In some examples of the method, UEs, and non-transitory computer-readable medium described herein, the capability of the UE may be associated with a guard period for switching from operating in the uplink mode to operating in the downlink mode and the threshold quantity of switching events includes the second count of supported switching events based on the capability of the UE requesting the guard period.

In some examples of the method, UEs, and non-transitory computer-readable medium described herein, the second count of supported switching events may be associated with switching from an uplink SBFD slot to a downlink SBFD slot, switching from uplink TDD to downlink SBFD within a mixed slot, switching from uplink SBFD to downlink TDD in a mixed slot, switching from uplink TDD to downlink TDD, or any combination thereof.

In some examples of the method, UEs, and non-transitory computer-readable medium described herein, the first count of supported switching events may be associated with switching from a downlink SBFD slot to an uplink SBFD slot, switching from downlink TDD to uplink SBFD within a mixed slot, switching from downlink SBFD to uplink TDD in a mixed slot, switching from downlink TDD to uplink TDD, or any combination thereof.

In some examples of the method, UEs, and non-transitory computer-readable medium described herein, transmitting the indication of the capability may include operations, features, means, or instructions for transmitting an indication of a zero value corresponding to the threshold quantity of switching events supported by the UE within the time period.

In some examples of the method, UEs, and non-transitory computer-readable medium described herein, the communicating may include operations, features, means, or instructions for receiving the downlink message during the time period and refraining from transmitting the uplink message during the time period based on transmitting the indication of the zero value.

In some examples of the method, UEs, and non-transitory computer-readable medium described herein, the communicating may include operations, features, means, or instructions for transmitting the uplink message and receiving the downlink message after transmitting the uplink message based on an absence of a guard period associated with the UE switching from operating in the uplink mode to operating in the downlink mode.

In some examples of the method, UEs, and non-transitory computer-readable medium described herein, communicating the one or more messages may include operations, features, means, or instructions for receiving a downlink control information message scheduling an uplink message within the time period.

Some examples of the method, UEs, and non-transitory computer-readable medium described herein may further include operations, features, means, or instructions for transmitting the uplink message based on receiving the downlink control information message and refraining from receiving a downlink message of the one or more messages based on transmitting the indication of the zero value and transmitting the uplink message.

A method for wireless communications by a network entity is described. The method may include obtaining an indication of a capability of a UE, the capability associated with a threshold quantity of switching events supported by the UE within a time period including one or more SBFD slots, where the switching events correspond to the UE switching between operating in a downlink mode and operating in an uplink mode, outputting scheduling for one or more messages to the UE, the one or more messages scheduled for communication during the time period in accordance with the capability of the UE, and communicating the one or more messages with the UE based on transmitting the scheduling.

A network entity for wireless communications is described. The network entity may include one or more memories storing processor executable code, and one or more processors coupled with the one or more memories. The one or more processors may individually or collectively be operable to execute the code to cause the network entity to obtain an indication of a capability of a UE, the capability associated with a threshold quantity of switching events supported by the UE within a time period including one or more SBFD slots, where the switching events correspond to the UE switching between operating in a downlink mode and operating in an uplink mode, output scheduling for one or more messages to the UE, the one or more messages scheduled for communication during the time period in accordance with the capability of the UE, and communicate the one or more messages with the UE based on transmitting the scheduling.

Another network entity for wireless communications is described. The network entity may include means for obtaining an indication of a capability of a UE, the capability associated with a threshold quantity of switching events supported by the UE within a time period including one or more SBFD slots, where the switching events correspond to the UE switching between operating in a downlink mode and operating in an uplink mode, means for outputting scheduling for one or more messages to the UE, the one or more messages scheduled for communication during the time period in accordance with the capability of the UE, and means for communicating the one or more messages with the UE based on transmitting the scheduling.

A non-transitory computer-readable medium storing code for wireless communications is described. The code may include instructions executable by one or more processors to obtain an indication of a capability of a UE, the capability associated with a threshold quantity of switching events supported by the UE within a time period including one or more SBFD slots, where the switching events correspond to the UE switching between operating in a downlink mode and operating in an uplink mode, output scheduling for one or more messages to the UE, the one or more messages scheduled for communication during the time period in accordance with the capability of the UE, and communicate the one or more messages with the UE based on transmitting the scheduling.

In some examples of the method, network entities, and non-transitory computer-readable medium described herein, a quantity of switching events for the scheduled one or more messages may be less than or equal to the threshold quantity of switching events based on transmitting the indication of the capability. In some examples of the method, network entities, and non-transitory computer-readable medium described herein, the time period corresponds to a SBFD pattern including the one or more SBFD slots.

In some examples of the method, network entities, and non-transitory computer-readable medium described herein, the capability may be associated with a second threshold quantity of switching events supported by the UE within each SBFD slot of the time period.

In some examples of the method, network entities, and non-transitory computer-readable medium described herein, obtaining the indication of the capability may include operations, features, means, or instructions for obtaining an indication of a non-zero value corresponding to the threshold quantity of switching events supported by the UE within the time period and an indication of a zero value corresponding to the second threshold quantity of switching events supported by the UE within each SBFD slot based on switching events being supported by the UE between SBFD slots.

In some examples of the method, network entities, and non-transitory computer-readable medium described herein, the time period includes a TDD-DL-UL pattern including the one or more SBFD slots and one or more TDD slots. In some examples of the method, network entities, and non-transitory computer-readable medium described herein, the time period includes a mixed slot having one or more SBFD symbols and one or more TDD symbols. In some examples of the method, network entities, and non-transitory computer-readable medium described herein, the time period corresponds to one SBFD slot.

In some examples of the method, network entities, and non-transitory computer-readable medium described herein, a quantity of switching events for the scheduled one or more messages includes a first count of supported switching events corresponding to the UE switching from operating in the downlink mode to operating in the uplink mode.

In some examples of the method, network entities, and non-transitory computer-readable medium described herein, the quantity of switching events for the scheduled one or more messages further includes a second count of supported switching events corresponding to the UE switching from operating in the uplink mode to operating in the downlink mode.

In some examples of the method, network entities, and non-transitory computer-readable medium described herein, the capability of the UE may be associated with a guard period for switching from operating in the uplink mode to operating in the downlink mode and the threshold quantity of switching events includes the second count of supported switching events based on the capability of the UE requesting the guard period.

In some examples of the method, network entities, and non-transitory computer-readable medium described herein, the second count of supported switching events may be associated with switching from an uplink SBFD slot to a downlink SBFD slot, switching from uplink TDD to downlink SBFD within a mixed slot, switching from uplink SBFD to downlink TDD in a mixed slot, switching from uplink TDD to downlink TDD, or any combination thereof.

In some examples of the method, network entities, and non-transitory computer-readable medium described herein, the first count of supported switching events may be associated with switching from a downlink SBFD slot to an uplink SBFD slot, switching from downlink TDD to uplink SBFD within a mixed slot, switching from downlink SBFD to uplink TDD in a mixed slot, switching from downlink TDD to uplink TDD, or any combination thereof.

In some examples of the method, network entities, and non-transitory computer-readable medium described herein, obtaining the indication of the capability may include operations, features, means, or instructions for obtaining an indication of a zero value corresponding to the threshold quantity of switching events supported by the UE within the time period.

In some examples of the method, network entities, and non-transitory computer-readable medium described herein, outputting the scheduling may include operations, features, means, or instructions for outputting scheduling for a downlink message for communication during the time period and refraining from outputting scheduling for an uplink message for communication during the time period based on receiving the indication of the zero value.

In some examples of the method, network entities, and non-transitory computer-readable medium described herein, the communicating may include operations, features, means, or instructions for obtaining the uplink message and outputting the downlink message after outputting the uplink message based on an absence of a guard period associated with the UE switching from operating in the uplink mode to operating in the downlink mode.

BRIEF DESCRIPTION OF THE DRAWINGS

FIGS. 13 through 16 show flowcharts illustrating methods that support an indication of a quantity of downlink and uplink switching for sub-band full duplex in accordance with one or more aspects of the present disclosure.

DETAILED DESCRIPTION

In some examples, a UE may be configured with a slot format, which may support some quantity of switching events (e.g., switching points) for the UE to switch between operating in an uplink and operating in a reception mode. However, some slot formats may support up to two switching events, or less depending on a pattern of the slot format (e.g., a downlink-downlink-switch-uplink (DDSU) pattern may support one switching event). In some cases, the UE may be configured to use SBFD techniques, which may allow for a larger quantity of switching events to be supported per SBFD pattern, thereby increasing resource utilization and throughput. However, a capability of the UE may limit a quantity of supported switching events by the UE within some time period. Further, the UE may not be configured with techniques for supporting switching events when SBFD slots are used in combination with TDD techniques. Accordingly, techniques to manage the operation of the UE in relation to switching events while supporting SBFD operation may be desired.

In accordance with examples as described herein, a UE may be configured to transmit an indication of a capability of the UE associated with a threshold quantity (e.g., a maximum quantity) of supported switching events by the UE within a time period. In some examples, the time period may refer to an SBFD pattern (e.g., containing one or more SBFD slots), a TDD pattern, such as a TDD-DL-UL pattern (e.g., which may include an SBFD pattern and one or more TDD slots), a single SBFD slot, a mixed slot having SBFD and non-SBFD (e.g., TDD) symbols, or any combination thereof. In some cases, the switching events may include events where the UE switches from operating in the reception mode (e.g., downlink mode) to operating in the transmission mode (e.g., uplink mode), while switching from the transmission mode to the reception mode may not be counted. In some other examples, switching from the transmission mode to the reception mode may be counted as a switching event, for example, based on a guard period being used between an uplink symbol and a downlink symbol. As such, higher throughput and scheduling efficiency may be achieved by performing scheduling for the UE in accordance with the threshold quantity of supported switching events.

Aspects of the disclosure are initially described in the context of wireless communications systems. Aspects of the disclosure are additionally described in the context of slot diagrams and process flows. Aspects of the disclosure are further illustrated by and described with reference to apparatus diagrams, system diagrams, and flowcharts that relate to quantity of downlink and uplink switching for sub-band full duplex.

Figure 1:
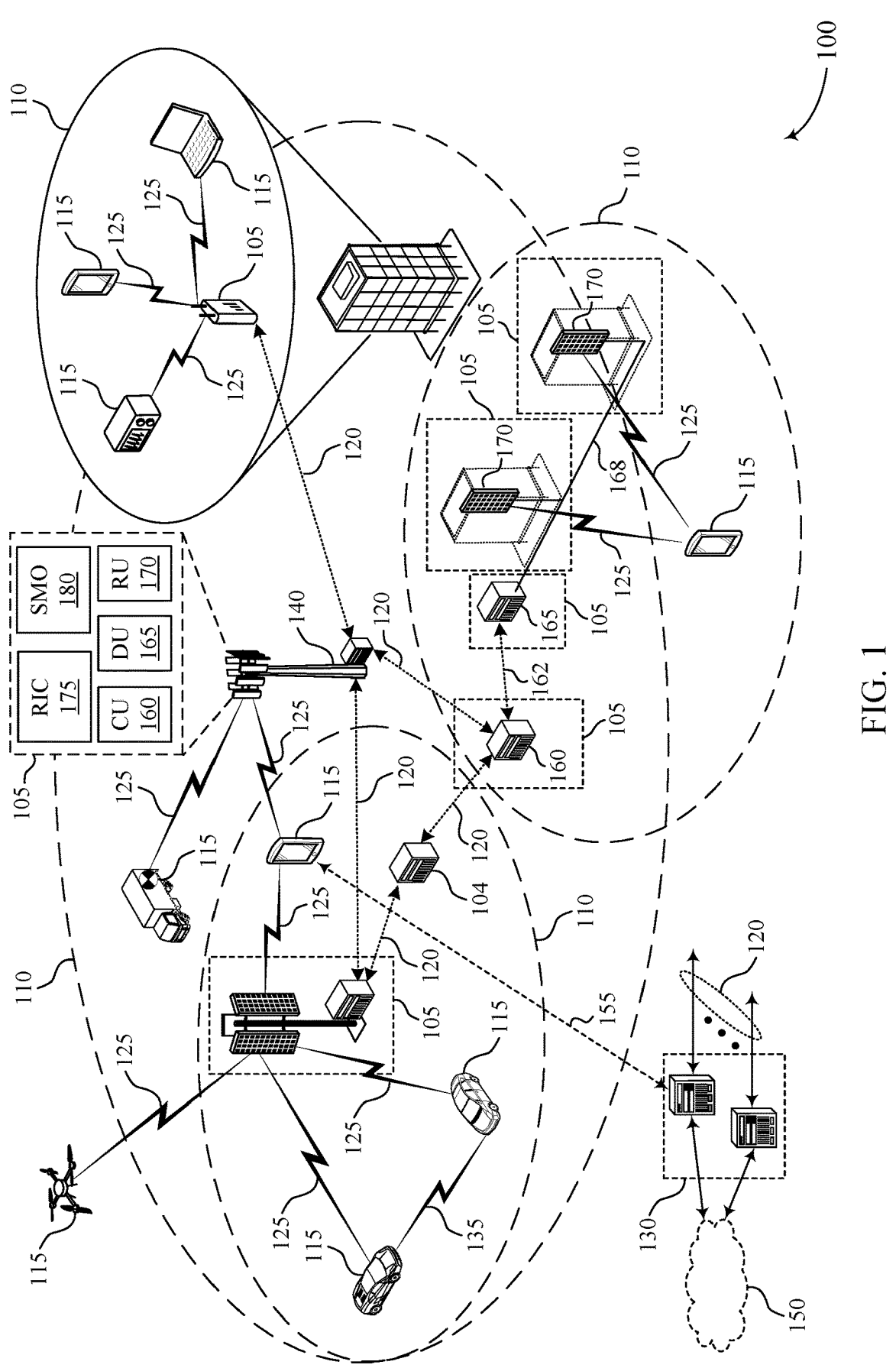
FIG. 1 shows an example of a wireless communications system that supports indication of a quantity of downlink and uplink switching for sub-band full duplex in accordance with one or more aspects of the present disclosure.

FIG. 1 shows an example of a wireless communications system 100 that supports indication of a quantity of downlink and uplink switching for sub-band full duplex in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE 115 may be configured with one or more slot formats for performing communications with a network entity 105, and the slot formats may support some quantity of switching events (e.g., switching points) for the UE 115 to switch between operating in a transmission mode (e.g., an uplink mode, a transmitting mode) and operating in a reception mode (e.g., a downlink mode, a receiving mode). Some slot formats may support zero switching events, such as downlink slots (e.g., having 14 downlink symbols), uplink slots (e.g., having 14 uplink symbols), or flexible slots (e.g., having 14 flexible symbols). Other slot formats may support one or two switching events. For example, a slot format may mix any quantity of downlink symbols, uplink symbols, and flexible symbols (e.g., separating the uplink symbols and downlink symbols), and may support more switching events (e.g., up to two). In some cases, a UE 115 may be configured to support one or more switching events (e.g., switch points) for TDD transmissions, such as defined by tdd-MultiDL-UL-SwitchPerSlot.

In some cases, the UE 115 may be configured to use SBFD techniques, which may allow for a larger quantity of switching events to be supported, for example, per SBFD pattern. For example, the UE 115 may be configured with both SBFD and non-SBFD (e.g., TDD) symbols. As such, resource utilization and throughput may be increased by allowing the UE 115 to receive or transmit more messages within some time period. In some cases, the UE 115 may be configured with a guard period when switching between SBFD symbols and non-SBFD symbols. Additionally, or alternatively, the guard period may be present when transitioning from a downlink symbol to an uplink symbol only. However, different UEs 115 may be limited by a respective capability of the respective UE 115, which may govern a quantity of switching events that may be supported by each UE 115 within some time period. Further, a UE 115 may not have a mechanism for indicating a quantity of switching events that may be supported for the UE 115 when using SBFD techniques.

Accordingly, techniques to define the operation of UEs 115 in relation to switching events while supporting SBFD operation may be desired.

In accordance with examples as described herein, a UE 115 may be configured to transmit an indication of a capability of the UE 115 associated with a threshold quantity (e.g., a maximum quantity) of supported switching events by the UE 115 within a time period. In some examples, the time period may refer to an SBFD pattern (e.g., containing one or more SBFD slots), a TDD pattern, such as a TDD-DL-UL pattern (e.g., which may include an SBFD pattern and one or more TDD slots), a single SBFD slot, a mixed slot having SBFD and non-SBFD (e.g., TDD) symbols, or any combination thereof. In some cases, the switching events may count events where the UE 115 switches from operating in the reception mode to operating in the transmission mode, but switching from the transmission mode to the reception mode may not be counted. In some other examples, switching from the transmission mode to the reception mode may be counted as a switching event, for example, based on a guard period being used between an uplink symbol and a downlink symbol. As such, higher throughput and scheduling efficiency may be achieved by performing scheduling for the UE 115 in accordance with the threshold quantity of supported switching events.

Figure 2:
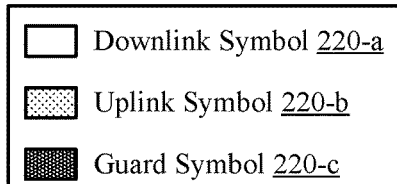
FIG. 2 shows an example of a wireless communications system that supports indication of a quantity of downlink and uplink switching for sub-band full duplex in accordance with one or more aspects of the present disclosure.
Figure 2:
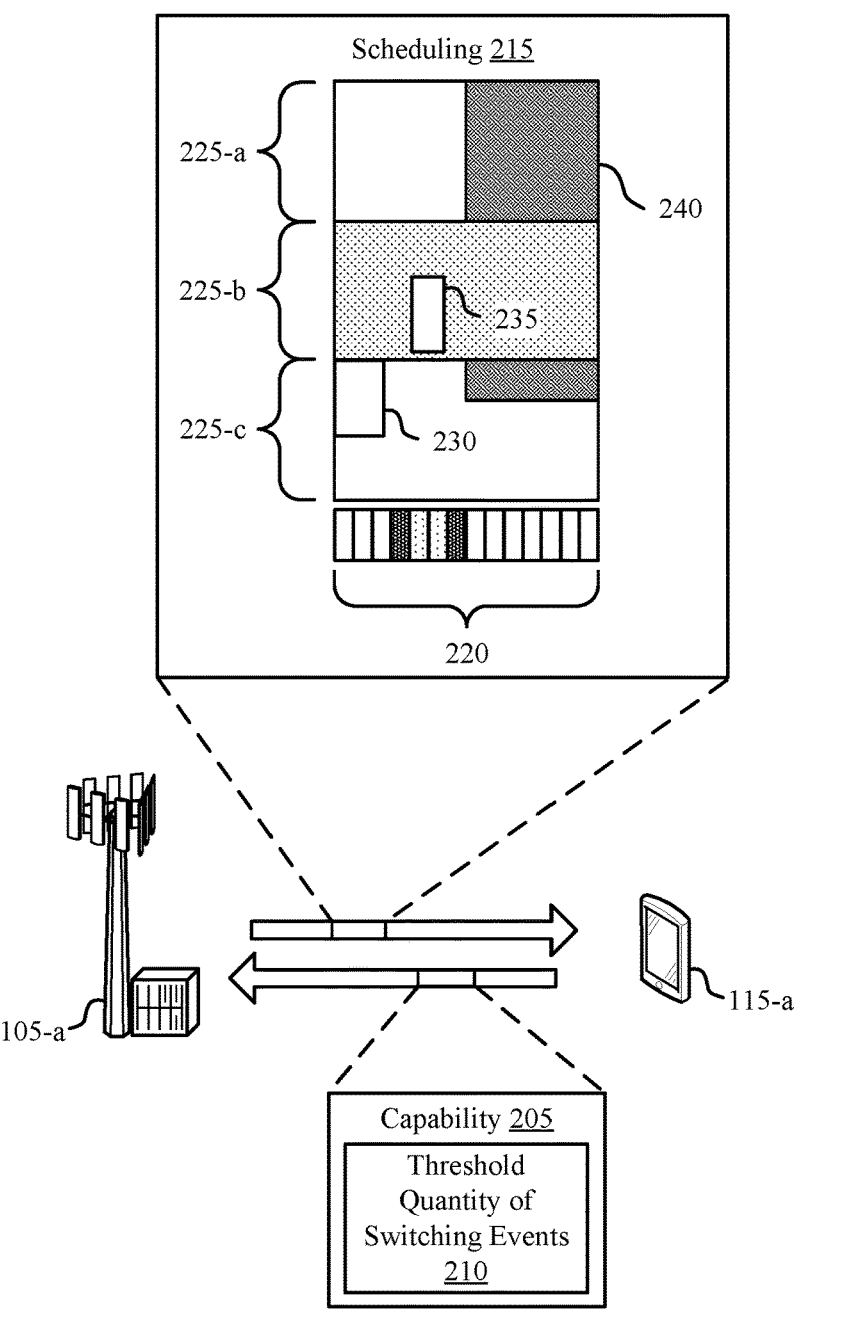
Figure 2:

FIG. 2 shows an example of a wireless communications system 200 that supports indication of a quantity of downlink and uplink switching for SBFD in accordance with one or more aspects of the present disclosure. The wireless communications system 200 illustrates communications between a UE 115-a and a network entity 105-a, which may be examples of corresponding devices as described herein.

In accordance with examples as described herein, the UE 115-a may transmit signaling (e.g., one or more messages) indicating a capability 205 corresponding to the UE 115-a. The capability may be associated with (e.g., may include or indicate) a threshold quantity of switching events 210 (e.g., a maximum quantity of supported switching events). The threshold quantity of switching events 210 may correspond to a quantity of switching events supported by the UE 115-a within a time period. As such, the network entity 105-a may schedule the UE 115-a in accordance with the threshold quantity of switching events 210 based on receiving the indication of the capability 205.

Switching events may correspond to when the UE 115-a switches from operating in a reception mode (e.g., for receiving messages or performing measurements, such as reference signal measurements, a downlink mode) and a transmission mode (e.g., for transmitting messages or signaling, an uplink mode). For example, switching events may include the UE 115-a switching from operating in the reception mode within a first SBFD symbol to operating in the transmission mode within a second SBFD symbol within an SBFD slot, switching from operating in the reception mode within a TDD downlink symbol to operating in the transmission mode within a SBFD symbol within a mixed slot, switching from operating in the reception mode within an SBFD symbol to operating in the transmission mode within a TDD uplink symbol within a mixed slot, or switching from operating in the reception mode within a TDD downlink symbol to operating in the transmission mode within a TDD uplink symbol. In some cases, a guard period (e.g., including one or more guard symbols) may be used between a downlink symbol and a next uplink symbol, which may allow for a UE 115-a to use timing advance techniques for a corresponding uplink transmission.

Similarly, switching events may also include the UE 115-a switching from operating in the transmission mode within a first SBFD symbol to operating in the reception mode within a second SBFD symbol within an SBFD slot, switching from operating in the transmission mode within a TDD downlink symbol to operating in the reception mode within a SBFD symbol within a mixed slot, switching from operating in the transmission mode within an SBFD symbol to operating in the reception mode within a TDD uplink symbol within a mixed slot, or switching from operating in the transmission mode within a TDD uplink symbol to operating in the reception mode within a TDD downlink symbol. In some cases, a guard period (e.g., including one or more guard symbols) may be used between an uplink symbol and a next downlink symbol, for example, based on whether the UE 115-a is to retune a local oscillator or adjust a frequency bandwidth when switching from the transmission mode to the reception mode.

In some examples, switching events that are counted for (e.g., count towards, for scheduling purposes) the threshold quantity of switching events 210 include events where the UE 115-a switches from operating in the reception mode to operating in the transmission mode, while switching events corresponding to the UE 115-a switching from the transmission mode to the reception mode are not counted. Alternatively, switching events corresponding to the UE 115-a switching from the transmission mode to the reception mode may be counted towards the threshold quantity of switching events 210. In some cases, the switching events corresponding to switching from the transmission mode to the reception mode may be counted based on a guard time being present or absent between a corresponding uplink symbol and downlink symbol (e.g., based on whether the UE 115-a requires use of a guard period for switching between the transmission mode and the reception mode), based on whether the UE 115-a is to retune a local oscillator or adjust a frequency bandwidth when switching from the transmission mode to the reception mode, some other condition, or a combination thereof. In some examples, the capability 205 may indicate whether the UE 115-a requests a guard period for switching between the transmission mode and the reception mode.

In some examples, the time period for the capability 205 may correspond to an SBFD pattern that includes one or more SBFD slots. For example, the threshold quantity of switching events 210 may indicate a quantity of switching events supported by the UE 115-a within the SBFD pattern. Additionally, or alternatively, the time period may correspond to a single SBFD slot. For example, the threshold quantity of switching events 210 may indicate a quantity of switching events supported by the UE 115-a within the SBFD slot. Additionally, or alternatively, the time period may correspond to a TDD pattern, which may be a TDD-DL-UL pattern, a mixed slot containing one or more SBFD symbols and one or more non-SBFD symbols, or both. Examples of the possible time periods are described in more detail herein, with reference to FIGS. 3A and 3B.

In some examples, the capability 205 may indicate a threshold quantity of switching events 210 for multiple of the time periods described herein. For example, to indicate the capability 205, the UE 115-a may indicate a first value corresponding to a first threshold quantity of supported switching events for an SBFD pattern, and the UE 115-a may indicate a second value corresponding to a first threshold quantity of supported switching events within an SBFD slot. In some cases, the first value may be larger than or equal to the second value, as the SBFD pattern may include at least one SBFD slot. In some examples, the UE 115-a may indicate a zero value for the second value, and a non-zero value for the first value, which may indicate the network entity 105-a that the UE 115-a may support switching events at a slot boundary (e.g., between slots), but not within a slot. The UE 115-a may additionally, or alternatively, indicate values corresponding to a quantity of supported switching events per TDD pattern (e.g., TDD-DL-UL pattern), per mixed slot, per another time period, or any combination thereof.

The network entity 105-a may indicate scheduling 215 to the UE 115-a in accordance with the capability 205. For example, the scheduling 215 may include symbols 220, such as downlink symbols 220-a, uplink symbols 220-b, and guard symbols 220-c. In some examples, a carrier (e.g., a TDD carrier) used by the UE 115-a for communications may be divided into sub-bands 225, such as the sub-band 225-a, the sub-band 225-b, and the sub-band 225-c. In some examples, different sub-bands may be configured for uplink or downlink according to a slot pattern. For example, FIG. 2 illustrates scheduling of an SBFD slot in which the sub-band 225-a and the sub-band 225-c may be configured for downlink, while the sub-band 225-b may be configured for uplink.

The quantity of switching events occurring within the scheduled communications may be based on the capability 205. For example, the scheduling 215 may schedule a downlink message 230 (e.g., physical downlink control channel monitoring occasion), an uplink message 235 (e.g., a sounding reference signal), and a downlink message 240 (e.g., a physical downlink shared channel). If switching from the transmission mode to the reception mode is not counted towards the threshold quantity of switching events 210, the scheduling 215 may count towards one switching event within the SBFD slot. As such, the scheduling 215 may be valid and scheduled by the network entity 105-a if the UE 115-a indicates a value of at least one corresponding to the threshold quantity of switching events 210 per SBFD slot. If switching from the transmission mode to the reception mode is counted towards the threshold quantity of switching events 210, then the scheduling 215 may correspond to two switching events, and may be scheduled if the UE 115-a indicates a value of at least two corresponding to the threshold quantity of switching events 210 per SBFD slot.

As such, scheduling restrictions may arise based on the capability 205 reported by the UE 115-a to the network entity 105-a. For example, the UE 115-a may indicate a zero value for the threshold quantity of switching events 210 for a time period. As such, if the UE 115-a is scheduled to receive a downlink message within the time period, the UE 115-a may receive the downlink message via one or more downlink symbols 220-a within the time period, but the UE 115-a may not transmit any uplink messages via uplink symbols 220-b within the time period. If the UE 115-a is scheduled for an uplink transmission via the uplink symbols 220-b within the time period, the UE 115-a may drop the uplink transmission (e.g., refrain from transmitting the uplink transmission).

Similarly, if the UE 115-a is scheduled to receive an uplink message within the time period after indicating the zero value, the UE 115-a may transmit the uplink message via one or more uplink symbols 220-b within the time period, but the UE 115-a may not receive any downlink messages via downlink symbols 220-a within the time period (e.g., the UE 115-a may refrain from monitoring for downlink messages within the one or more downlink symbols 220-a). Alternatively, for example if switching from the transmission mode to the reception mode is not counted towards the threshold quantity of switching events 210, the UE 115-a may receive one or more downlink messages after transmitting the uplink message within the time period, but the UE 115-a may refrain from transmitting any additional uplink messages after switching to the reception mode to receive the downlink messages.

Accordingly, the UE 115-a and the network entity 105-a may support communicating in accordance with the capability 205 of the UE 115-a, which may support scheduling 215 with improved throughput and communication efficiency.

Figure 3A:
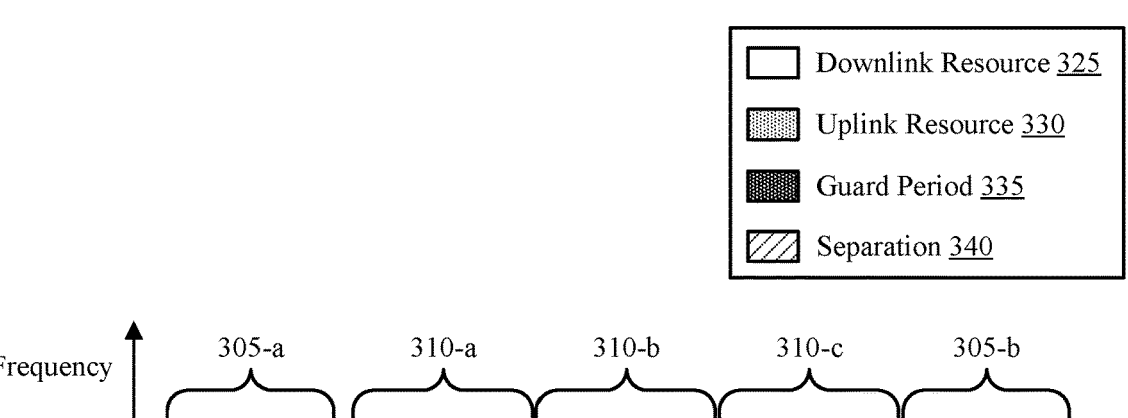
FIGS. 3A and 3B show examples of slot diagrams that supports indication of a quantity of downlink and uplink switching for sub-band full duplex in accordance with one or more aspects of the present disclosure.
Figure 3A:
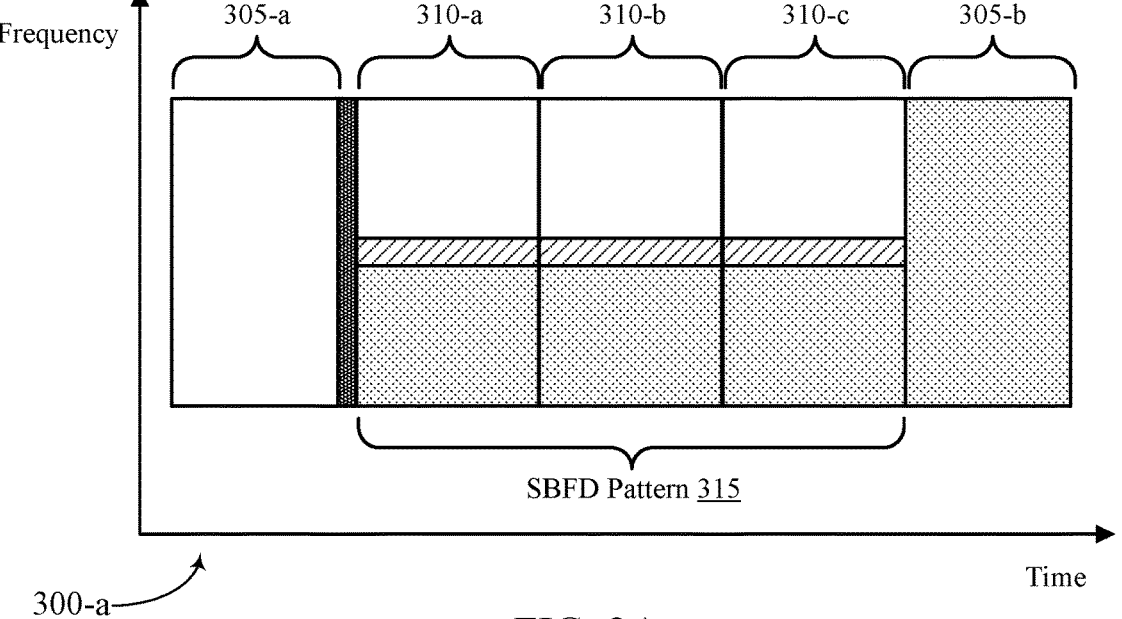
Figure 3B:
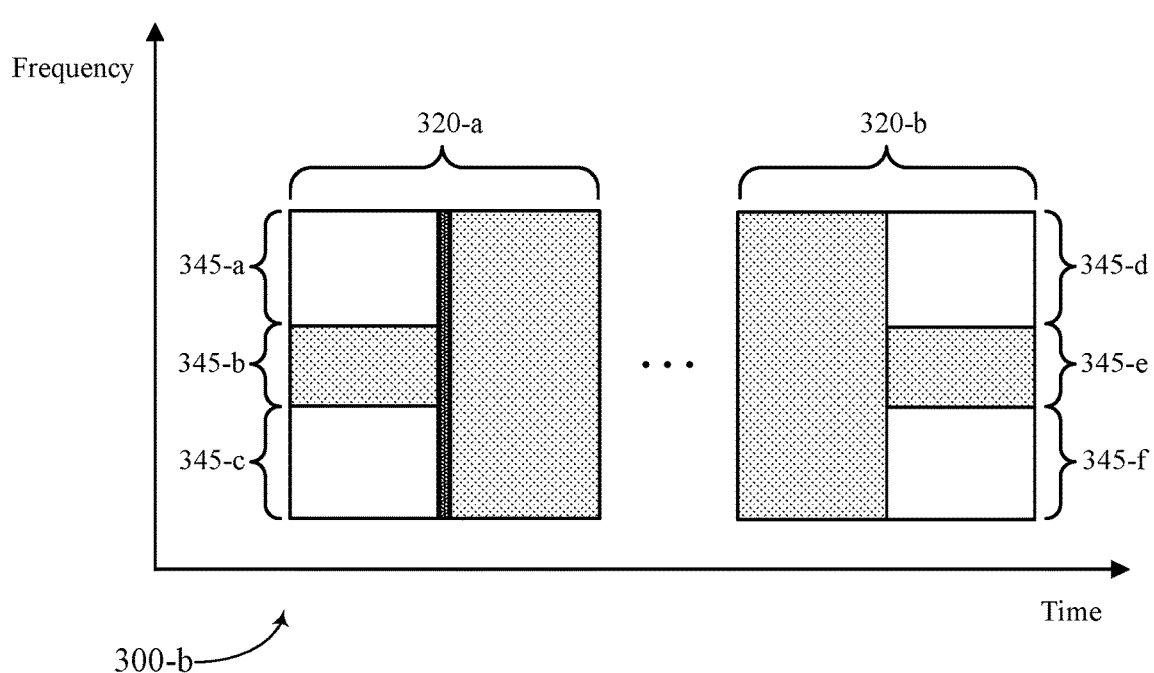

FIG. 3A and FIG. 3B show examples of a slot diagram 300-a and a slot diagram 300-b that support indication of a quantity of downlink and uplink switching for SBFD in accordance with one or more aspects of the present disclosure. The slot diagram 300-a and the slot diagram 300-b illustrate possible scheduling patterns (e.g., slot patterns) for a UE 115, as described herein.

In accordance with examples as described herein, a UE 115 may transmit an indication of a capability of the UE 115 associated with a threshold quantity of switching events supported by the UE 115 within an SBFD pattern 315. The SBFD pattern 315 may refer to a slot pattern used for resources of a carrier (e.g., a TDD carrier) used by the UE 115, and the SBFD pattern 315 include one or more SBFD slots 310, such as an SBFD slot 310-a, an SBFD slot 310-b, and an SBFD slot 310-c. In some cases, each SBFD slot 310 may include one or more frequency sub-bands corresponding to a downlink resource 325 and one or more frequency sub-bands corresponding to an uplink resource 330. In some cases, each SBFD slot 310 may also include a separation 340, which may correspond to a frequency portion separating a downlink resource 325 and an uplink resource 330. In some examples, the SBFD pattern 315 may be indicated to the UE 115 by a network entity in accordance with a periodicity, such as an SBFD periodicity (e.g., which may be the same as a periodicity corresponding to a TDD pattern). Accordingly, the capability may indicate a threshold quantity of switching events supported by the UE 115 within the SBFD pattern 315.

Additionally, or alternatively, the UE 115 may transmit an indication of a capability of the UE 115 associated with a threshold quantity of switching events supported by the UE 115 within a single SBFD slot 310. For example, the UE 115 may indicate a value of one corresponding to the threshold quantity of switching events supported by the UE 115 within a single SBFD slot 310, and a network entity 105 may schedule the UE 115 such that at most one switching event occurs per SBFD slot 310. For instance, the UE 115 may be scheduled to begin operating in a reception mode for the SBFD slot 310-a to receive one or more downlink messages and switch to operating in the transmission mode within the SBFD slot 310-a to transmit one or more messages. Alternatively, the UE 115 may be scheduled to begin operating in the transmission mode for the SBFD slot 310-a and switch to operating in the reception mode within the SBFD slot 310-a.

In some cases, if the UE 115 is scheduled to switch from the transmission mode to the reception mode within a single SBFD slot 310, a guard period may be used to allow the UE 115 to adjust a local oscillator of the UE 115, to adjust a frequency bandwidth for RF operation, or both. The UE 115 may indicate whether a guard period should be scheduled via the capability. In some examples, the UE 115 may be subject to a requirement for a limit quantity of switching event allowed in a single SBFD slot 310 by a network (e.g., the network entity 105). For example, the UE 115 may be limited to one switching event per SBFD slot 310, regardless of the capability of the UE 115.

Additionally, or alternatively, the UE 115 may transmit an indication of a capability of the UE 115 associated with a threshold quantity of switching events supported by the UE 115 within a TDD pattern, such as a TDD-UL-DL pattern. In some examples, the TDD pattern may include the SBFD pattern 315 and one or more TDD symbols 305, such as a TDD symbol 305-a and a TDD symbol 305-b. For example, the slot diagram 300-a may illustrate a TDD pattern. As such, the TDD pattern may include one or more transition points between TDD symbols 305 (e.g., non-SBFD symbols) and SBFD symbols 310. In some examples, a guard period 335 may be configured at each transition point between TDD symbols 305 and SBFD symbols 310. For example, a guard period 335 may be included between the TDD symbol 305-*a* and the SBFD slot 310-*a*. Alternatively, a guard period 335 may be configured at transition points following a downlink TDD symbol 305, such as the TDD symbol 305-*a*, but may be omitted at transition points prior to an uplink TDD symbol 305, such as the TDD symbol 305-*b*.

Additionally, or alternatively, the UE 115 may transmit an indication of a capability of the UE 115 associated with a threshold quantity of switching events supported by the UE 115 within a mixed slot 320. The slot diagram 300-*b* illustrates examples of a mixed slot 320-*a* and a mixed slot 320-*b*. Each mixed slot 320 may include one or more (e.g., consecutive) SBFD symbols and one or more (e.g., consecutive) non-SBFD symbols. In some examples, a guard period 335 may be used separating the SBFD symbols and the non-SBFD symbols. Additionally, or alternatively, the guard period 335 may be used when some conditions are met, such as (e.g., only) when one or more uplink non-SBFD symbols follow one or more SBFD symbols.

In some examples, if the UE 115 indicates a zero value corresponding to the threshold quantity of switching events supported by the UE 115 within a mixed slot 320, a network entity 105-*a* may schedule the UE 115 such that the UE 115 does not switch operating modes between the SBFD symbols and the non-SBFD symbols. For instance, a network entity 105 may schedule the UE 115-*a* to transmit messages via an uplink sub-band 345-*b* of the SBFD symbols of the mixed slot 320-*a*, via the non-SBFD symbols of the mixed slot 320-*a*, or both, but the network entity 105-*a* may refrain from scheduling the UE 115-*a* to receive messages via a downlink sub-band 345-*a* or a downlink sub-band 345-*c* of the SBFD symbols.

In some cases, such as if switching from operating in a transmission mode to operating in a reception mode does not count toward the threshold quantity of switching events supported by the UE 115, the network entity 105-*a* may schedule the UE 115 to transmit an uplink message via the non-SBFD symbols of the mixed slot 320-*b* and to subsequently receive a downlink message via a sub-band 345-*d* or a sub-band 345-*f* of the SBFD symbols of the mixed slot 320-*b* or transmit a second uplink message via a sub-band 345-*e* of the SBFD symbols of the mixed slot 320-*b* (e.g., as long as no downlink message is schedule following the second uplink message).

The UE 115 may indicate any combination of the threshold quantity of switching events described herein, with respect to any combination of the time periods described herein. For example, the UE 115 may transmit an indication of a threshold quantity of switching events per SBFD pattern and per SBFD slot. For instance, the UE 115 may indicate a value of one for a threshold quantity of switching events per SBFD slot, and the UE 115 may indicate a value of M for a threshold quantity of switching events per SBFD pattern containing a quantity of N SBFD slots, and M may be smaller or equal to N. If M is less than N, then the network entity 105 may schedule the UE 115 with up to one switching event per SBFD slot until a quantity of M switching events are met within a same SBFD pattern, which may result in some SBFD slots having no switching events.

Figure 4:
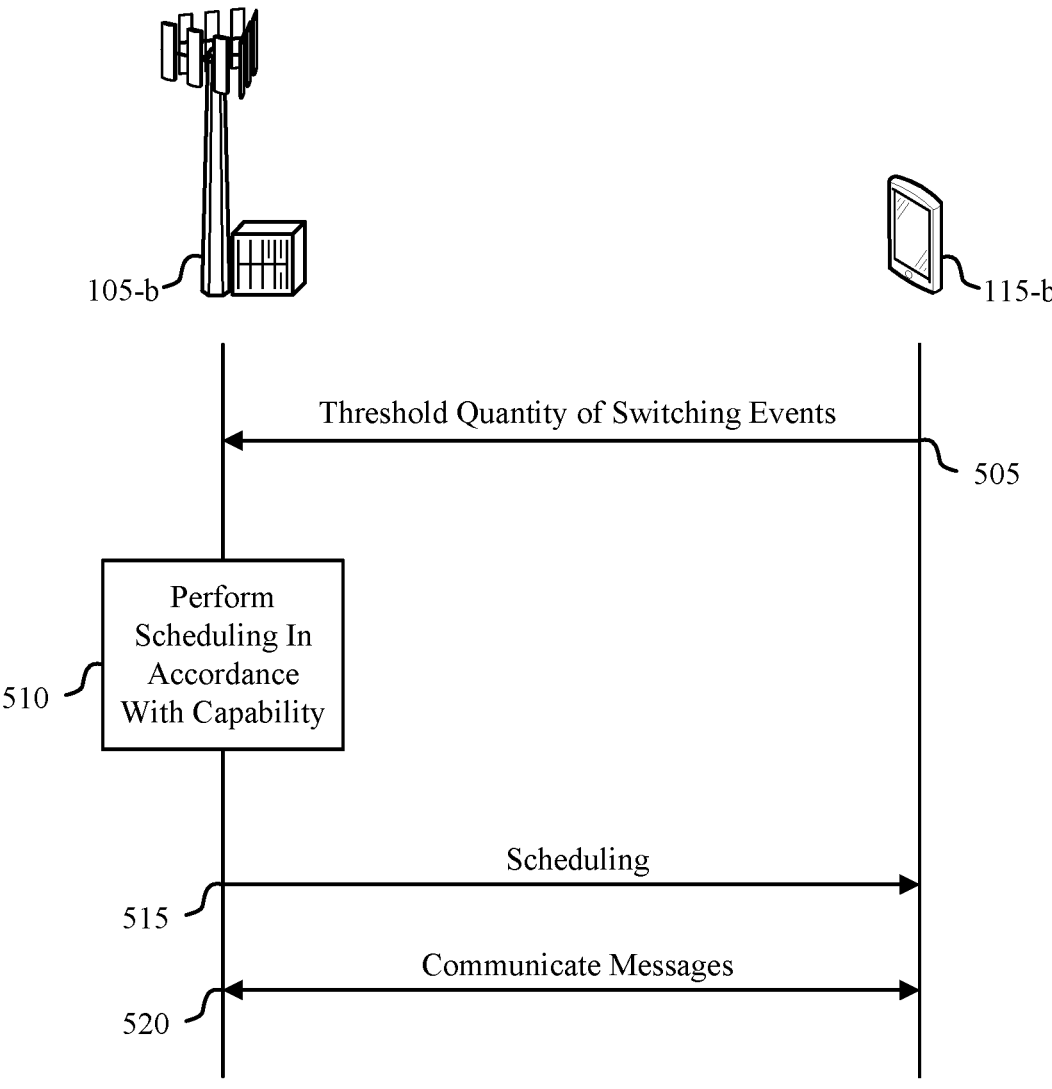
FIG. 4 shows an example of a process flow that supports indication of a quantity of downlink and uplink switching for sub-band full duplex in accordance with one or more aspects of the present disclosure.

FIG. 4 shows an example of a process flow 400 that supports indication of a quantity of downlink and uplink switching for SBFD in accordance with one or more aspects of the present disclosure. The process flow 400 illustrates communications between a UE 115-*b* and a network entity 105-*b*, which may be examples of corresponding devices as described herein. In some examples, steps shown in the process flow 400 may be omitted or performed in a different order than shown. Additionally, or alternatively, some steps not shown may be added to the process flow 400.

At 505, the UE 115-*b* may transmit an indication of a capability of the UE 115-*b*. The capability may be associated with a threshold quantity of switching events supported by the UE 115-*b* within a time period including one or more SBFD slots, wherein the switching events correspond to the UE 115-*b* switching between operating in a reception mode and operating in a transmission mode. The time period may correspond to an SBFD pattern, an SBFD slot, a TDD pattern (e.g., a TDD-DL-UL pattern), a mixed slot, or a combination thereof.

At 510, the network entity 105-*b* may perform scheduling in accordance with the capability of the UE 115-*b* based on receiving the indication of the capability. For example, the network entity 105-*b* may perform scheduling such that a quantity of switching events for one or more scheduled messages is less than or equal to the threshold quantity of switching events. In some examples, switching events corresponding to the UE 115-*b* switching from the reception mode to the transmission mode are counted towards the threshold quantity of switching events, while switching events corresponding to the UE 115-*b* switching from the transmission mode to the reception mode are not counted. Alternatively, the switching events corresponding to the UE 115-*b* switching from the transmission mode to the reception mode may be counted, for instance, based on a guard time being scheduled between an uplink symbol and a downlink symbol, based on whether tuning of a local oscillator of the UE 115-*b* is to be performed, or both.

At 515, the network entity 105-*b* may transmit an indication of the scheduling to the UE 115-*b*. At 520, the UE 115-*b* and the network entity 105-*b* may communicate the one or more messages based on the scheduling. In some examples, the UE 115-*b* may receive a downlink message that schedules an uplink message within the time period. In some cases, the UE 115-*b* may refrain from transmitting the uplink message based on a quantity of switching events performed or scheduled during the time period, such as to not exceed the threshold quantity of switching events.

Figure 5:
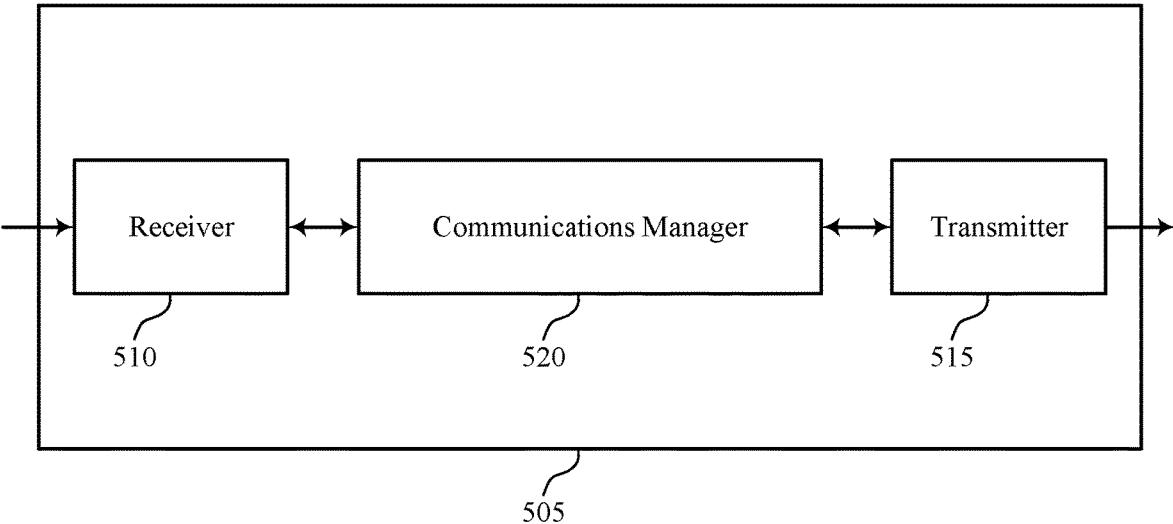
FIGS. 5 and 6 show block diagrams of devices that support an indication of a quantity of downlink and uplink switching for sub-band full duplex in accordance with one or more aspects of the present disclosure.

FIG. 5 shows a block diagram 500 of a device 505 that supports indication of a quantity of downlink and uplink switching for SBFD in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include one or more processors, which may be coupled with one or more memories, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to quantity of downlink and uplink switching for SBFD). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to quantity of downlink and uplink switching for SBFD). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of quantity of downlink and uplink switching for SBFD as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, one or more processors and one or more memories coupled with the one or more processors may be configured to perform one or more of the functions described herein (e.g., by one or more processors, individually or collectively, executing instructions stored in the one or more memories).

Additionally, or alternatively, the communications manager 520, the receiver 510, the transmitter 515, or various combinations or components thereof may be implemented in code (e.g., as communications management software or firmware) executed by one or more processors (e.g., referred to as a processor-executable code). If implemented in code executed by one or more processors, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for transmitting an indication of a capability of the UE, the capability associated with a threshold quantity of switching events supported by the UE within a time period including one or more SBFD slots, where the switching events correspond to the UE switching between operating in a reception mode and operating in a transmission mode. The communications manager 520 is capable of, configured to, or operable to support a means for receiving scheduling for one or more messages, the one or more messages scheduled for communication during the time period in accordance with the capability of the UE. The communications manager 520 is capable of, configured to, or operable to support a means for communicating the one or more messages with a network entity based on receiving the scheduling.

By including or configuring the communications manager 520 in accordance with examples as described herein, the device 505 (e.g., one or more processors controlling or otherwise coupled with the receiver 510, the transmitter 515, the communications manager 520, or a combination thereof) may support techniques for more efficient utilization of communication resources and higher signaling throughput.

Figure 6:
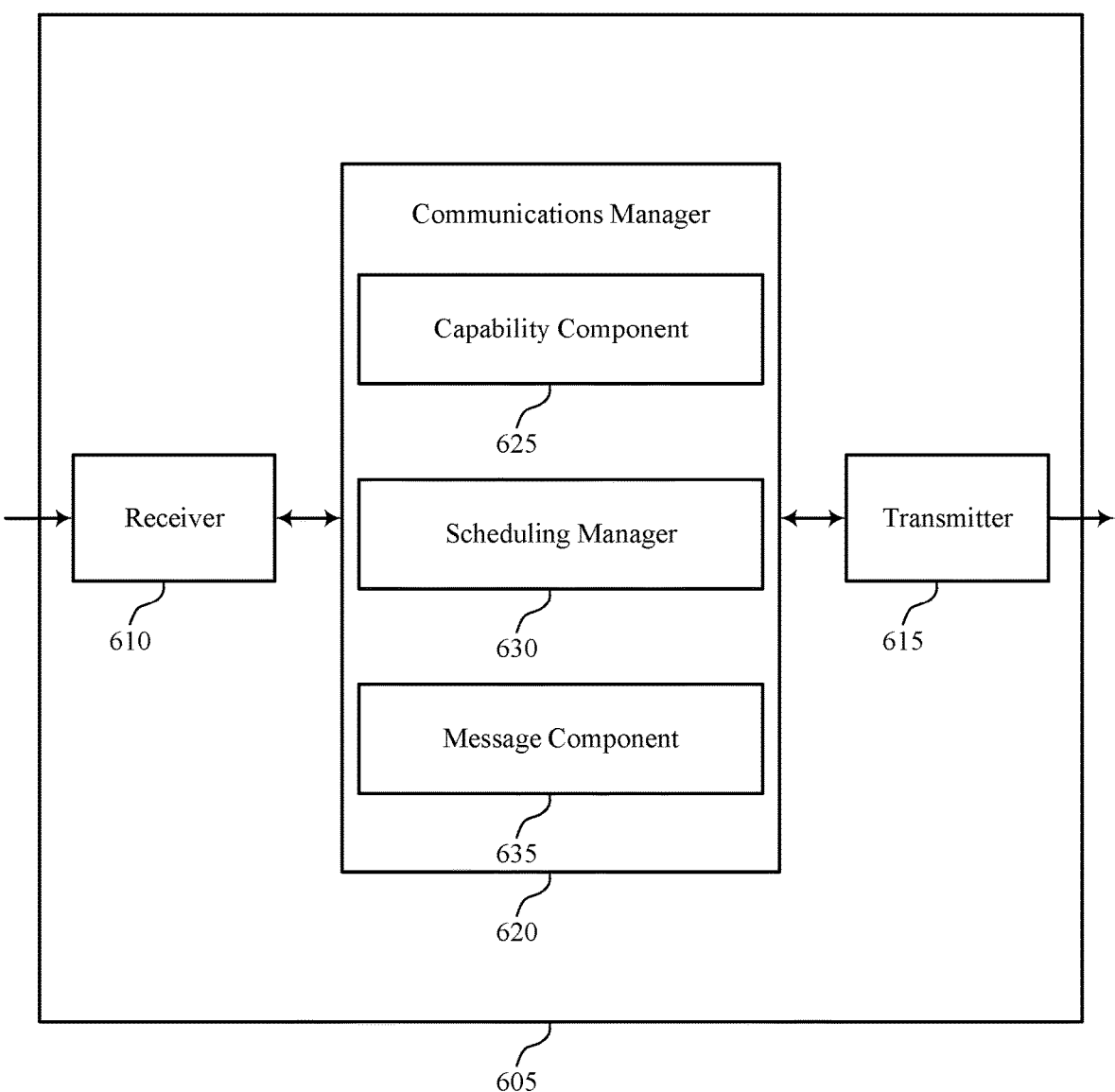

FIG. 6 shows a block diagram 600 of a device 605 that supports indication of a quantity of downlink and uplink switching for SBFD in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include one or more processors, which may be coupled with one or more memories, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to quantity of downlink and uplink switching for SBFD). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to quantity of downlink and uplink switching for SBFD). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of quantity of downlink and uplink switching for SBFD as described herein. For example, the communications manager 620 may include a capability component 625, a scheduling manager 630, a message component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The capability component 625 is capable of, configured to, or operable to support a means for transmitting an indication of a capability of the UE, the capability associated with a threshold quantity of switching events supported by the UE within a time period including one or more SBFD slots, where the switching events correspond to the UE switching between operating in a reception mode and operating in a transmission mode. The scheduling manager 630 is capable of, configured to, or operable to support a means for receiving scheduling for one or more messages, the one or more messages scheduled for communication during the time period in accordance with the capability of the UE. The message component 635 is capable of, configured to, or operable to support a means for communicating the one or more messages with a network entity based on receiving the scheduling.

Figure 7:
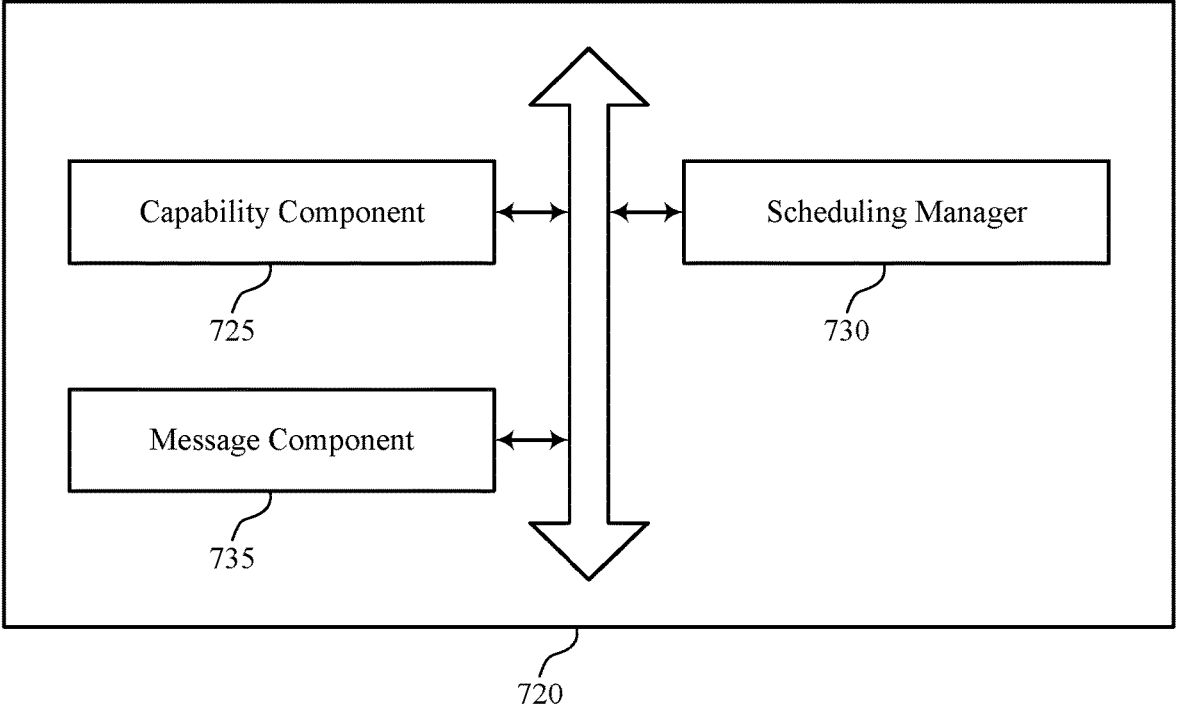
FIG. 7 shows a block diagram of a communications manager that supports indication of a quantity of downlink and uplink switching for sub-band full duplex in accordance with one or more aspects of the present disclosure.

FIG. 7 shows a block diagram 700 of a communications manager 720 that supports indication of a quantity of downlink and uplink switching for SBFD in accordance with one or more aspects of the present disclosure. The communications manager 720 may be an example of aspects of a communications manager 520, a communications manager 620, or both, as described herein. The communications manager 720, or various components thereof, may be an example of means for performing various aspects of quantity of downlink and uplink switching for SBFD as described herein. For example, the communications manager 720 may include a capability component 725, a scheduling manager 730, a message component 735, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The capability component 725 is capable of, configured to, or operable to support a means for transmitting an indication of a capability of the UE, the capability associated with a threshold quantity of switching events supported by the UE within a time period including one or more SBFD slots, where the switching events correspond to the UE switching between operating in a reception mode and operating in a transmission mode. The scheduling manager 730 is capable of, configured to, or operable to support a means for receiving scheduling for one or more messages, the one or more messages scheduled for communication during the time period in accordance with the capability of the UE. The message component 735 is capable of, configured to, or operable to support a means for communicating the one or more messages with a network entity based on receiving the scheduling.

In some examples, a quantity of switching events for the scheduled one or more messages includes less than or equal to the threshold quantity of switching events based on transmitting the indication of the capability. In some examples, the time period corresponds to a SBFD pattern including the one or more SBFD slots and one or more SBFD symbols. In some examples, the capability is associated with a second threshold quantity of switching events supported by the UE within each SBFD slot of the time period.

In some examples, to support transmitting the indication of the capability, the capability component 725 is capable of, configured to, or operable to support a means for transmitting an indication of a non-zero value corresponding to the threshold quantity of switching events supported by the UE within the time period and an indication of a zero value corresponding to the second threshold quantity of switching events supported by the UE within each SBFD slot based on switching events being supported by the UE between SBFD slots.

In some examples, the time period includes a time division duplex downlink-uplink pattern including the one or more SBFD slots and one or more time division duplex slots and one or more slots having SBFD symbols and non-SBFD symbols. In some examples, the time period includes a mixed slot having one or more SBFD symbols and one or more time division duplex symbols. In some examples, the time period corresponds to one SBFD slot.

In some examples, a quantity of switching events for the scheduled one or more messages includes a first count of supported switching events corresponding to the UE switching from operating in the reception mode to operating in the transmission mode, the quantity of switching events satisfying the threshold quantity of switching events.

In some examples, the quantity of switching events for the scheduled one or more messages further includes a second count of supported switching events corresponding to the UE switching from operating in the transmission mode to operating in the reception mode.

In some examples, the capability of the UE is associated with a guard period for switching from operating in the transmission mode to operating in the reception mode. In some examples, the threshold quantity of switching events includes the second count of supported switching events based on the capability of the UE requesting the guard period.

In some examples, the second count of supported switching events is switching from the transmission mode for an uplink sub-band full duplex symbol to the reception mode for a downlink sub-band of a full duplex symbol, switching from the transmission mode for an uplink time division duplex symbol to the reception mode for a downlink sub-band of a full duplex symbol within a mixed slot, switching from the transmission mode for an uplink sub-band full duplex symbol to the reception mode for a downlink time division duplex symbol in a mixed slot, switching from the transmission mode for an uplink time division duplex symbol to the reception mode for a downlink time division duplex symbol, or any combination thereof.

In some examples, the first count of supported switching events is associated with switching from the reception mode for a downlink sub-band full duplex symbol to the transmission mode for an uplink sub-band full duplex symbol, switching from the reception mode for a downlink time division duplex symbol to the transmission mode for an uplink sub-band full duplex symbol within a mixed slot, switching from the reception mode for a downlink sub-band full duplex symbol to the transmission mode for an uplink time division duplex symbol in a mixed slot, switching from the reception mode for a downlink time division duplex symbol to the transmission mode for an uplink time division duplex symbol, or any combination thereof.

In some examples, to support transmitting the indication of the capability, the capability component 725 is capable of, configured to, or operable to support a means for transmitting an indication of a zero value corresponding to the threshold quantity of switching events supported by the UE within the time period.

In some examples, to support communicating, the message component 735 is capable of, configured to, or operable to support a means for receiving the downlink message during the time period. In some examples, to support communicating, the scheduling manager 730 is capable of, configured to, or operable to support a means for refraining from transmitting the uplink message during the time period based on transmitting the indication of the zero value.

In some examples, to support communicating, the message component 735 is capable of, configured to, or operable to support a means for transmitting the uplink message. In some examples, to support communicating, the message component 735 is capable of, configured to, or operable to support a means for receiving the downlink message after transmitting the uplink message based on an absence of a guard period associated with the UE switching from operating in the transmission mode to operating in the reception mode.

In some examples, to support communicating the one or more messages, the message component 735 is capable of, configured to, or operable to support a means for receiving a downlink control information message scheduling an uplink message within the time period.

In some examples, the message component 735 is capable of, configured to, or operable to support a means for transmitting the uplink message based on receiving the downlink control information message. In some examples, the scheduling manager 730 is capable of, configured to, or operable to support a means for refraining from receiving a downlink message of the one or more messages based on transmitting the indication of the zero value and transmitting the uplink message.

Figure 8:
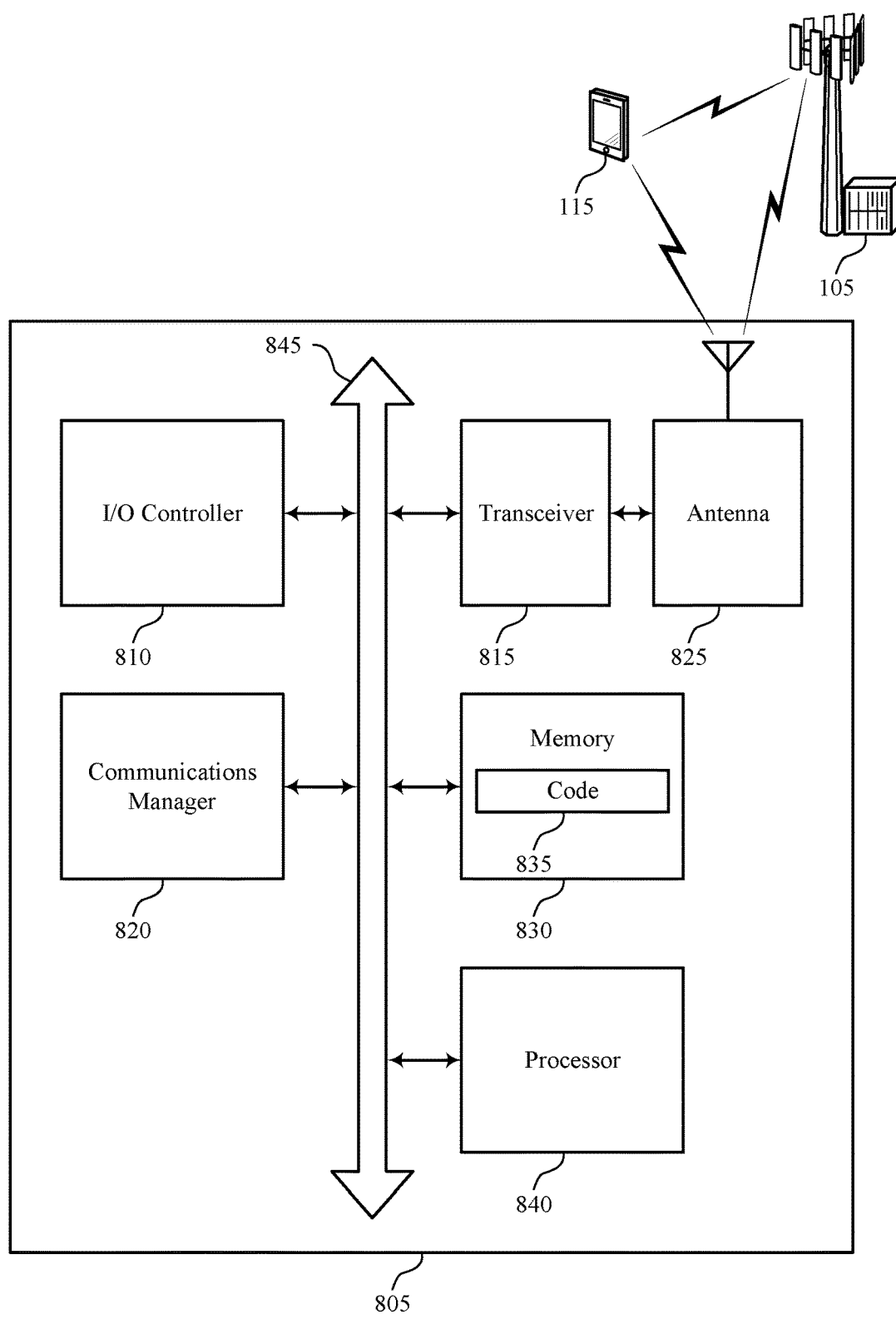
FIG. 8 shows a diagram of a system including a device that supports indication of a quantity of downlink and uplink switching for sub-band full duplex in accordance with one or more aspects of the present disclosure.

FIG. 8 shows a diagram of a system 800 including a device 805 that supports indication of a quantity of downlink and uplink switching for SBFD in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, one or more memories 830, code 835, and one or more processors 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the one or more processors 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The one or more memories 830 may include random access memory (RAM) and read-only memory (ROM). The one or more memories 830 may store computer-readable, computer-executable, or processor-executable code, such as the code 835. The code 835 may include instructions that, when executed by the one or more processors 840, cause the device 805 to perform various functions described herein. The code 835 may be stored in a non-transitory computer-readable medium such as system memory or another type of memory. In some cases, the code 835 may not be directly executable by the one or more processors 840 but may cause a computer (e.g., when compiled and executed) to perform functions described herein. In some cases, the one or more memories 830 may include, among other things, a basic I/O system (BIOS) which may control basic hardware or software operation such as the interaction with peripheral components or devices.

The one or more processors 840 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the one or more processors 840 may be configured to operate a memory array using a memory controller. In some other cases, a memory controller may be integrated into the one or more processors 840. The one or more processors 840 may be configured to execute computer-readable instructions stored in a memory (e.g., the one or more memories 830) to cause the device 805 to perform various functions (e.g., functions or tasks supporting quantity of downlink and uplink switching for SBFD). For example, the device 805 or a component of the device 805 may include one or more processors 840 and one or more memories 830 coupled with or to the one or more processors 840, the one or more processors 840 and the one or more memories 830 configured to perform various functions described herein. In some examples, the one or more processors 840 may include multiple processors and the one or more memories 830 may include multiple memories. One or more of the multiple processors may be coupled with one or more of the multiple memories, which may, individually or collectively, be configured to perform various functions described herein. In some examples, the one or more processors 840 may be a component of a processing system, which may refer to a system (such as a series) of machines, circuitry (including, for example, one or both of processor circuitry (which may include the one or more processors 840) and memory circuitry (which may include the one or more memories 830)), or components, that receives or obtains inputs and processes the inputs to produce, generate, or obtain a set of outputs. The processing system may be configured to perform one or more of the functions described herein. For example, the one or more processors 840 or a processing system including the one or more processors 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the one or more memories 830 or otherwise, to perform one or more of the functions described herein.

The communications manager 820 may support wireless communications in accordance with examples as disclosed herein. For example, the communications manager 820 is capable of, configured to, or operable to support a means for transmitting an indication of a capability of the UE, the capability associated with a threshold quantity of switching events supported by the UE within a time period including one or more SBFD slots, where the switching events correspond to the UE switching between operating in a reception mode and operating in a transmission mode. The communications manager 820 is capable of, configured to, or operable to support a means for receiving scheduling for one or more messages, the one or more messages scheduled for communication during the time period in accordance with the capability of the UE. The communications manager 820 is capable of, configured to, or operable to support a means for communicating the one or more messages with a network entity based on receiving the scheduling.

By including or configuring the communications manager 820 in accordance with examples as described herein, the device 805 may support techniques for more efficient utilization of communication resources and higher signaling throughput.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the one or more processors 840, the one or more memories 830, the code 835, or any combination thereof. For example, the code 835 may include instructions executable by the one or more processors 840 to cause the device 805 to perform various aspects of quantity of downlink and uplink switching for SBFD as described herein, or the one or more processors 840 and the one or more memories 830 may be otherwise configured to, individually or collectively, perform or support such operations.

Figure 9:
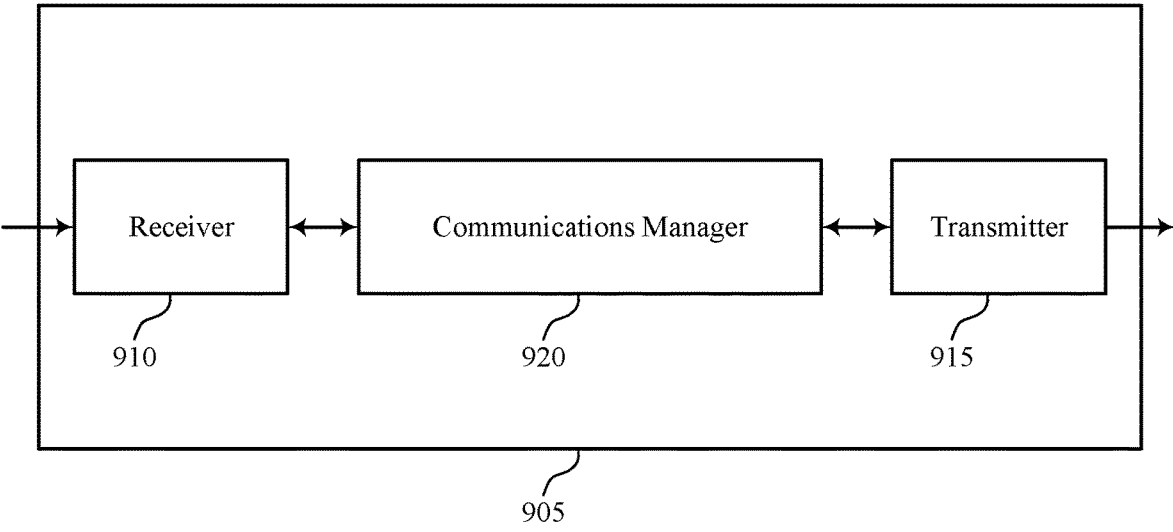
FIGS. 9 and 10 show block diagrams of devices that support an indication of a quantity of downlink and uplink switching for sub-band full duplex in accordance with one or more aspects of the present disclosure.

FIG. 9 shows a block diagram 900 of a device 905 that supports indication of a quantity of downlink and uplink switching for SBFD in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include one or more processors, which may be coupled with one or more memories, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of quantity of downlink and uplink switching for SBFD as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, one or more processors and one or more memories coupled with the one or more processors may be configured to perform one or more of the functions described herein (e.g., by one or more processors, individually or collectively, executing instructions stored in the one or more memories).

Additionally, or alternatively, the communications manager 920, the receiver 910, the transmitter 915, or various combinations or components thereof may be implemented in code (e.g., as communications management software or firmware) executed by one or more processors (e.g., referred to as a processor-executable code). If implemented in code executed by one or more processors, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for obtaining an indication of a capability of a UE, the capability associated with a threshold quantity of switching events supported by the UE within a time period including one or more SBFD slots, where the switching events correspond to the UE switching between operating in a reception mode and operating in a transmission mode. The communications manager 920 is capable of, configured to, or operable to support a means for outputting scheduling for one or more messages to the UE, the one or more messages scheduled for communication during the time period in accordance with the capability of the UE. The communications manager 920 is capable of, configured to, or operable to support a means for communicating the one or more messages with the UE based on transmitting the scheduling.

By including or configuring the communications manager 920 in accordance with examples as described herein, the device 905 (e.g., one or more processors controlling or otherwise coupled with the receiver 910, the transmitter 915, the communications manager 920, or a combination thereof) may support techniques for more efficient utilization of communication resources and higher signaling throughput.

Figure 10:
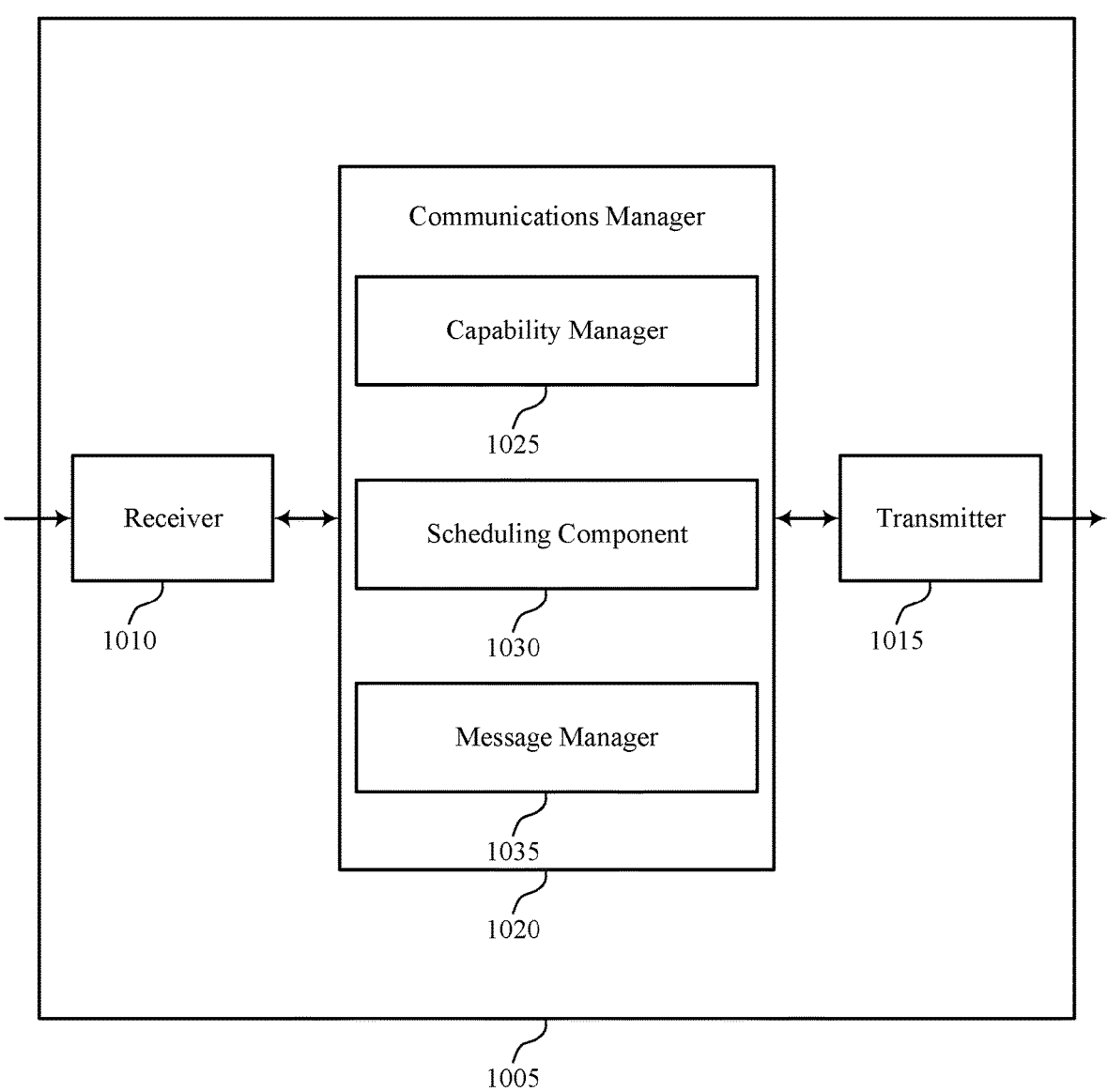

FIG. 10 shows a block diagram 1000 of a device 1005 that supports indication of a quantity of downlink and uplink switching for SBFD in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include one or more processors, which may be coupled with one or more memories, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of quantity of downlink and uplink switching for SBFD as described herein. For example, the communications manager 1020 may include a capability manager 1025, a scheduling component 1030, a message manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The capability manager 1025 is capable of, configured to, or operable to support a means for obtaining an indication of a capability of a UE, the capability associated with a threshold quantity of switching events supported by the UE within a time period including one or more SBFD slots, where the switching events correspond to the UE switching between operating in a reception mode and operating in a transmission mode. The scheduling component 1030 is capable of, configured to, or operable to support a means for outputting scheduling for one or more messages to the UE, the one or more messages scheduled for communication during the time period in accordance with the capability of the UE. The message manager 1035 is capable of, configured to, or operable to support a means for communicating the one or more messages with the UE based on transmitting the scheduling.

Figure 11:
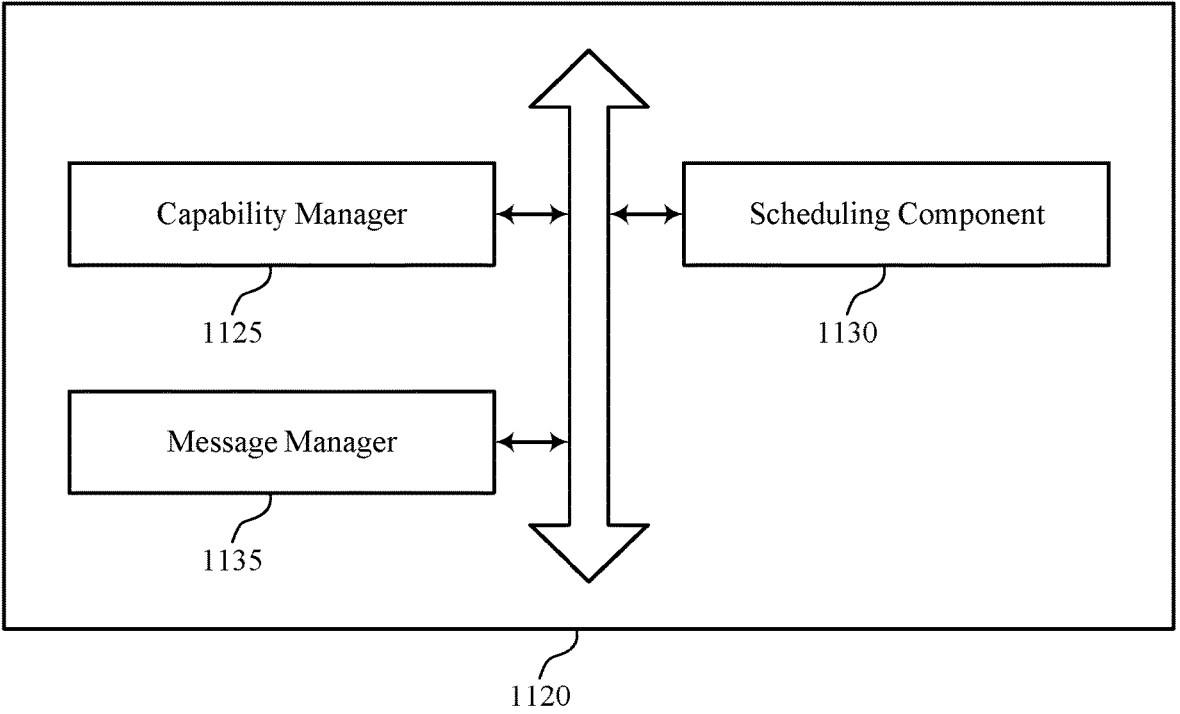
FIG. 11 shows a block diagram of a communications manager that supports indication of a quantity of downlink and uplink switching for sub-band full duplex in accordance with one or more aspects of the present disclosure.
Figure 11:

FIG. 11 shows a block diagram 1100 of a communications manager 1120 that supports indication of a quantity of downlink and uplink switching for SBFD in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of quantity of downlink and uplink switching for SBFD as described herein. For example, the communications manager 1120 may include a capability manager 1125, a scheduling component 1130, a message manager 1135, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The capability manager 1125 is capable of, configured to, or operable to support a means for obtaining an indication of a capability of a UE, the capability associated with a threshold quantity of switching events supported by the UE within a time period including one or more SBFD slots, where the switching events correspond to the UE switching between operating in a reception mode and operating in a transmission mode. The scheduling component 1130 is capable of, configured to, or operable to support a means for outputting scheduling for one or more messages to the UE, the one or more messages scheduled for communication during the time period in accordance with the capability of the UE. The message manager 1135 is capable of, configured to, or operable to support a means for communicating the one or more messages with the UE based on transmitting the scheduling.

In some examples, a quantity of switching events for the scheduled one or more messages is less than or equal to the threshold quantity of switching events based on transmitting the indication of the capability. In some examples, the time period corresponds to a SBFD pattern including the one or more SBFD slots and one or more SBFD symbols. In some examples, the capability is associated with a second threshold quantity of switching events supported by the UE within each SBFD slot of the time period.

In some examples, to support obtaining the indication of the capability, the capability manager 1125 is capable of, configured to, or operable to support a means for obtaining an indication of a non-zero value corresponding to the threshold quantity of switching events supported by the UE within the time period and an indication of a zero value corresponding to the second threshold quantity of switching events supported by the UE within each SBFD slot based on switching events being supported by the UE between SBFD slots.

In some examples, the time period includes a time division duplex downlink-uplink pattern including the one or more SBFD slots and one or more time division duplex slots and one or more slots having SBFD symbols and non-SBFD symbols. In some examples, the time period includes a mixed slot having one or more SBFD symbols and one or more time division duplex symbols. In some examples, the time period corresponds to one SBFD slot. In some examples, a quantity of switching events for the scheduled one or more messages includes a first count of supported switching events corresponding to the UE switching from operating in the reception mode to operating in the transmission mode.

In some examples, the quantity of switching events for the scheduled one or more messages further includes a second count of supported switching events corresponding to the UE switching from operating in the transmission mode to operating in the reception mode.

In some examples, the capability of the UE is associated with a guard period for switching from operating in the transmission mode to operating in the reception mode. In some examples, the threshold quantity of switching events includes the second count of supported switching events based on the capability of the UE requesting the guard period.

In some examples, the second count of supported switching events is associated with switching from the transmission mode for an uplink sub-band full duplex symbol to the reception mode for a downlink sub-band of a full duplex symbol, switching from the transmission mode for an uplink time division duplex symbol to the reception mode for a downlink sub-band of a full duplex symbol within a mixed slot, switching from the transmission mode for an uplink sub-band full duplex symbol to the reception mode for a downlink time division duplex symbol in a mixed slot, switching from the transmission mode for an uplink time division duplex symbol to the reception mode for a downlink time division duplex symbol, or any combination thereof.

In some examples, the first count of supported switching events is associated with switching from the reception mode for a downlink sub-band full duplex symbol to the transmission mode for an uplink sub-band full duplex symbol, switching from the reception mode for a downlink time division duplex symbol to the transmission mode for an uplink sub-band full duplex symbol within a mixed slot, switching from the reception mode for a downlink sub-band full duplex symbol to the transmission mode for an uplink time division duplex symbol in a mixed slot, switching from the reception mode for a downlink time division duplex symbol to the transmission mode for an uplink time division duplex symbol, or any combination thereof.

In some examples, to support obtaining the indication of the capability, the capability manager 1125 is capable of, configured to, or operable to support a means for obtaining an indication of a zero value corresponding to the threshold quantity of switching events supported by the UE within the time period.

In some examples, to support outputting the scheduling, the scheduling component 1130 is capable of, configured to, or operable to support a means for outputting scheduling for a downlink message for communication during the time period. In some examples, to support outputting the scheduling, the scheduling component 1130 is capable of, configured to, or operable to support a means for refraining from outputting scheduling for an uplink message for communication during the time period based on receiving the indication of the zero value.

In some examples, to support communicating, the message manager 1135 is capable of, configured to, or operable to support a means for obtaining the uplink message. In some examples, to support communicating, the message manager 1135 is capable of, configured to, or operable to support a means for outputting the downlink message after outputting the uplink message based on an absence of a guard period associated with the UE switching from operating in the transmission mode to operating in the reception mode.

Figure 12:
FIG. 12 shows a diagram of a system including a device that supports indication of a quantity of downlink and uplink switching for sub-band full duplex in accordance with one or more aspects of the present disclosure.

FIG. 12 shows a diagram of a system 1200 including a device 1205 that supports indication of a quantity of downlink and uplink switching for SBFD in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, one or more memories 1225, code 1230, and one or more processors 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the one or more processors 1235, the one or more memories 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The one or more memories 1225 may include RAM, ROM, or any combination thereof. The one or more memories 1225 may store computer-readable, computer-executable, or processor-executable code, such as the code 1230. The code 1230 may include instructions that, when executed by one or more of the one or more processors 1235, cause the device 1205 to perform various functions described herein. The code 1230 may be stored in a non-transitory computer-readable medium such as system memory or another type of memory. In some cases, the code 1230 may not be directly executable by a processor of the one or more processors 1235 but may cause a computer (e.g., when compiled and executed) to perform functions described herein. In some cases, the one or more memories 1225 may include, among other things, a BIOS which may control basic hardware or software operation such as the interaction with peripheral components or devices. In some examples, the one or more processors 1235 may include multiple processors and the one or more memories 1225 may include multiple memories. One or more of the multiple processors may be coupled with one or more of the multiple memories which may, individually or collectively, be configured to perform various functions herein (for example, as part of a processing system).

The one or more processors 1235 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the one or more processors 1235 may be configured to operate a memory array using a memory controller. In some other cases, a memory controller may be integrated into one or more of the one or more processors 1235. The one or more processors 1235 may be configured to execute computer-readable instructions stored in a memory (e.g., one or more of the one or more memories 1225) to cause the device 1205 to perform various functions (e.g., functions or tasks supporting quantity of downlink and uplink switching for SBFD). For example, the device 1205 or a component of the device 1205 may include one or more processors 1235 and one or more memories 1225 coupled with one or more of the one or more processors 1235, the one or more processors 1235 and the one or more memories 1225 configured to perform various functions described herein. The one or more processors 1235 may be an example of a cloud-computing platform (e.g., one or more physical nodes and supporting software such as operating systems, virtual machines, or container instances) that may host the functions (e.g., by executing code 1230) to perform the functions of the device 1205. The one or more processors 1235 may be any one or more suitable processors capable of executing scripts or instructions of one or more software programs stored in the device 1205 (such as within one or more of the one or more memories 1225). In some examples, the one or more processors 1235 may include multiple processors and the one or more memories 1225 may include multiple memories. One or more of the multiple processors may be coupled with one or more of the multiple memories, which may, individually or collectively, be configured to perform various functions herein. In some examples, the one or more processors 1235 may be a component of a processing system, which may refer to a system (such as a series) of machines, circuitry (including, for example, one or both of processor circuitry (which may include the one or more processors 1235) and memory circuitry (which may include the one or more memories 1225)), or components, that receives or obtains inputs and processes the inputs to produce, generate, or obtain a set of outputs. The processing system may be configured to perform one or more of the functions described herein. For example, the one or more processors 1235 or a processing system including the one or more processors 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the one or more memories 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the one or more memories 1225, the code 1230, and the one or more processors 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for obtaining an indication of a capability of a UE, the capability associated with a threshold quantity of switching events supported by the UE within a time period including one or more SBFD slots, where the switching events correspond to the UE switching between operating in a reception mode and operating in a transmission mode. The communications manager 1220 is capable of, configured to, or operable to support a means for outputting scheduling for one or more messages to the UE, the one or more messages scheduled for communication during the time period in accordance with the capability of the UE. The communications manager 1220 is capable of, configured to, or operable to support a means for communicating the one or more messages with the UE based on transmitting the scheduling.

By including or configuring the communications manager 1220 in accordance with examples as described herein, the device 1205 may support techniques for more efficient utilization of communication resources and higher signaling throughput.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the one or more processors 1235, one or more of the one or more memories 1225, the code 1230, or any combination thereof (for example, by a processing system including at least a portion of the one or more processors 1235, the one or more memories 1225, the code 1230, or any combination thereof). For example, the code 1230 may include instructions executable by one or more of the one or more processors 1235 to cause the device 1205 to perform various aspects of quantity of downlink and uplink switching for SBFD as described herein, or the one or more processors 1235 and the one or more memories 1225 may be otherwise configured to, individually or collectively, perform or support such operations.

FIG. 13 shows a flowchart illustrating a method 1300 that supports indication of a quantity of downlink and uplink switching for SBFD in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting an indication of a capability of the UE, the capability associated with a threshold quantity of switching events supported by the UE within a time period including one or more SBFD slots, where the switching events correspond to the UE switching between operating in a reception mode and operating in a transmission mode. The operations of 1305 may be performed in accordance with examples as disclosed herein. In some examples, aspects of the operations of 1305 may be performed by a capability component 725 as described with reference to FIG. 7.

At 1310, the method may include receiving scheduling for one or more messages, the one or more messages scheduled for communication during the time period in accordance with the capability of the UE. The operations of 1310 may be performed in accordance with examples as disclosed herein. In some examples, aspects of the operations of 1310 may be performed by a scheduling manager 730 as described with reference to FIG. 7.

At 1315, the method may include communicating the one or more messages with a network entity based on receiving the scheduling. The operations of 1315 may be performed in accordance with examples as disclosed herein. In some examples, aspects of the operations of 1315 may be performed by a message component 735 as described with reference to FIG. 7.

FIG. 14 shows a flowchart illustrating a method 1400 that supports indication of a quantity of downlink and uplink switching for SBFD in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting an indication of a capability of the UE, the capability associated with a threshold quantity of switching events supported by the UE within a time period including one or more SBFD slots, where the switching events correspond to the UE switching between operating in a reception mode and operating in a transmission mode, and where the indication includes a zero-value corresponding to the threshold quantity of switching events supported by the UE within the time period. The operations of 1405 may be performed in accordance with examples as disclosed herein. In some examples, aspects of the operations of 1405 may be performed by a capability component 725 as described with reference to FIG. 7.

At 1410, the method may include receiving scheduling for one or more messages, the one or more messages scheduled for communication during the time period in accordance with the capability of the UE. The operations of 1410 may be performed in accordance with examples as disclosed herein. In some examples, aspects of the operations of 1410 may be performed by a scheduling manager 730 as described with reference to FIG. 7.

At 1415, the method may include communicating the one or more messages with a network entity based on receiving the scheduling. The operations of 1415 may be performed in accordance with examples as disclosed herein. In some examples, aspects of the operations of 1415 may be performed by a message component 735 as described with reference to FIG. 7.

FIG. 15 shows a flowchart illustrating a method 1500 that supports indication of a quantity of downlink and uplink switching for SBFD in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include obtaining an indication of a capability of a UE, the capability associated with a threshold quantity of switching events supported by the UE within a time period including one or more SBFD slots, where the switching events correspond to the UE switching between operating in a reception mode and operating in a transmission mode. The operations of 1505 may be performed in accordance with examples as disclosed herein. In some examples, aspects of the operations of 1505 may be performed by a capability manager 1125 as described with reference to FIG. 11.

At 1510, the method may include outputting scheduling for one or more messages to the UE, the one or more messages scheduled for communication during the time period in accordance with the capability of the UE. The operations of 1510 may be performed in accordance with examples as disclosed herein. In some examples, aspects of the operations of 1510 may be performed by a scheduling component 1130 as described with reference to FIG. 11.

At 1515, the method may include communicating the one or more messages with the UE based on transmitting the scheduling. The operations of 1515 may be performed in accordance with examples as disclosed herein. In some examples, aspects of the operations of 1515 may be performed by a message manager 1135 as described with reference to FIG. 11.

FIG. 16 shows a flowchart illustrating a method 1600 that supports indication of a quantity of downlink and uplink switching for SBFD in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include obtaining an indication of a capability of a UE, the capability associated with a threshold quantity of switching events supported by the UE within a time period including one or more SBFD slots, where the switching events correspond to the UE switching between operating in a reception mode and operating in a transmission mode, and where the indication includes a zero-value corresponding to the threshold quantity of switching events supported by the UE within the time period. The operations of 1605 may be performed in accordance with examples as disclosed herein. In some examples, aspects of the operations of 1605 may be performed by a capability manager 1125 as described with reference to FIG. 11.

At 1610, the method may include outputting scheduling for one or more messages to the UE, the one or more messages scheduled for communication during the time period in accordance with the capability of the UE. The operations of 1610 may be performed in accordance with examples as disclosed herein. In some examples, aspects of the operations of 1610 may be performed by a scheduling component 1130 as described with reference to FIG. 11.

At 1615, the method may include communicating the one or more messages with the UE based on transmitting the scheduling. The operations of 1615 may be performed in accordance with examples as disclosed herein. In some examples, aspects of the operations of 1615 may be performed by a message manager 1135 as described with reference to FIG. 11.

The following provides an overview of aspects of the present disclosure:

Aspect 1: A method for wireless communications by a UE, comprising: transmitting an indication of a capability of the UE, the capability associated with a threshold quantity of switching events supported by the UE within a time period comprising one or more SBFD slots, wherein the switching events correspond to the UE switching between operating in a reception mode and operating in an transmission mode; receiving scheduling for one or more messages, the one or more messages scheduled for communication during the time period in accordance with the capability of the UE; and communicating the one or more messages with a network entity based at least in part on receiving the scheduling.

Aspect 2: The method of aspect 1, wherein a quantity of switching events for the scheduled one or more messages comprises less than or equal to the threshold quantity of switching events based at least in part on transmitting the indication of the capability.

Aspect 3: The method of any of aspects 1 through 2, wherein the time period corresponds to a SBFD pattern comprising the one or more SBFD slots.

Aspect 4: The method of any of aspects 1 through 3, wherein the capability is associated with a second threshold quantity of switching events supported by the UE within each SBFD slot of the time period.

Aspect 5: The method of aspect 4, wherein transmitting the indication of the capability further comprises: transmitting an indication of a non-zero value corresponding to the threshold quantity of switching events supported by the UE within the time period and an indication of a zero value corresponding to the second threshold quantity of switching events supported by the UE within each SBFD slot based at least in part on switching events being supported by the UE between SBFD slots.

Aspect 6: The method of any of aspects 1 through 5, wherein the time period comprises a TDD-DL-UL pattern comprising the one or more SBFD slots and one or more TDD slots.

Aspect 7: The method of any of aspects 1 through 2, wherein the time period comprises a mixed slot having one or more SBFD symbols and one or more TDD symbols.

Aspect 8: The method of any of aspects 1 through 2, wherein the time period corresponds to one SBFD slot.

Aspect 9: The method of any of aspects 1 through 8, wherein a quantity of switching events for the scheduled one or more messages comprises a first count of supported switching events corresponding to the UE switching from operating in the reception mode to operating in the transmission mode, the quantity of switching events satisfying the threshold quantity of switching events.

Aspect 10: The method of aspect 9, wherein the quantity of switching events for the scheduled one or more messages further comprises a second count of supported switching events corresponding to the UE switching from operating in the transmission mode to operating in the reception mode.

Aspect 11: The method of aspect 10, wherein the capability of the UE is associated with a guard period for switching from operating in the transmission mode to operating in the reception mode, and the threshold quantity of switching events comprises the second count of supported switching events based at least in part on the capability of the UE requesting the guard period.

Aspect 12: The method of any of aspects 10 through 11, wherein the second count of supported switching events is associated with switching from an uplink SBFD slot to a downlink SBFD slot, switching from uplink TDD to downlink SBFD within a mixed slot, switching from uplink SBFD to downlink TDD in a mixed slot, switching from uplink TDD to downlink TDD, or any combination thereof.

Aspect 13: The method of any of aspects 9 through 12, wherein the first count of supported switching events is associated with switching from a downlink SBFD slot to an uplink SBFD slot, switching from downlink TDD to uplink SBFD within a mixed slot, switching from downlink SBFD to uplink TDD in a mixed slot, switching from downlink TDD to uplink TDD, or any combination thereof.

Aspect 14: The method of any of aspects 1 through 13, wherein transmitting the indication of the capability further comprises: transmitting an indication of a zero value corresponding to the threshold quantity of switching events supported by the UE within the time period.

Aspect 15: The method of aspect 14, wherein the one or more messages scheduled for communication during the time period comprise a downlink message and an uplink message, and wherein the communicating comprises: receiving the downlink message during the time period; and refraining from transmitting the uplink message during the time period based at least in part on transmitting the indication of the zero value.

Aspect 16: The method of any of aspects 14 through 15, wherein the one or more messages scheduled for communication during the time period comprise a downlink message and an uplink message, and wherein the communicating comprises: transmitting the uplink message; and receiving the downlink message after transmitting the uplink message based at least in part on an absence of a guard period associated with the UE switching from operating in the transmission mode to operating in the reception mode.

Aspect 17: The method of any of aspects 14 through 16, wherein, and wherein communicating the one or more messages comprises: receiving a downlink control information message scheduling an uplink message within the time period.

Aspect 18: The method of aspect 17, further comprising: transmitting the uplink message based at least in part on receiving the downlink control information message; and refraining from receiving a downlink message of the one or more messages based at least in part on transmitting the indication of the zero value and transmitting the uplink message.

Aspect 19: A method for wireless communications by a network entity, comprising: obtaining an indication of a capability of a UE, the capability associated with a threshold quantity of switching events supported by the UE within a time period comprising one or more SBFD slots, wherein the switching events correspond to the UE switching between operating in a reception mode and operating in an transmission mode; outputting scheduling for one or more messages to the UE, the one or more messages scheduled for communication during the time period in accordance with the capability of the UE; and communicating the one or more messages with the UE based at least in part on transmitting the scheduling.

Aspect 20: The method of aspect 19, wherein a quantity of switching events for the scheduled one or more messages is less than or equal to the threshold quantity of switching events based at least in part on transmitting the indication of the capability.

Aspect 21: The method of any of aspects 19 through 20, wherein the time period corresponds to a SBFD pattern comprising the one or more SBFD slots.

Aspect 22: The method of any of aspects 19 through 21, wherein the capability is associated with a second threshold quantity of switching events supported by the UE within each SBFD slot of the time period.

Aspect 23: The method of aspect 22, wherein obtaining the indication of the capability further comprises: obtaining an indication of a non-zero value corresponding to the threshold quantity of switching events supported by the UE within the time period and an indication of a zero value corresponding to the second threshold quantity of switching events supported by the UE within each SBFD slot based at least in part on switching events being supported by the UE between SBFD slots.

Aspect 24: The method of any of aspects 19 through 23, wherein the time period comprises a TDD-DL-UL pattern comprising the one or more SBFD slots and one or more TDD slots.

Aspect 25: The method of any of aspects 19 through 20, wherein the time period comprises a mixed slot having one or more SBFD symbols and one or more TDD symbols.

Aspect 26: The method of any of aspects 19 through 20, wherein the time period corresponds to one SBFD slot.

Aspect 27: The method of any of aspects 19 through 26, wherein a quantity of switching events for the scheduled one or more messages comprises a first count of supported switching events corresponding to the UE switching from operating in the reception mode to operating in the transmission mode.

Aspect 28: The method of aspect 27, wherein the quantity of switching events for the scheduled one or more messages further comprises a second count of supported switching events corresponding to the UE switching from operating in the transmission mode to operating in the reception mode.

Aspect 29: The method of aspect 28, wherein the capability of the UE is associated with a guard period for switching from operating in the transmission mode to operating in the reception mode, and the threshold quantity of switching events comprises the second count of supported switching events based at least in part on the capability of the UE requesting the guard period.

Aspect 30: The method of any of aspects 28 through 29, wherein the second count of supported switching events is associated with switching from an uplink SBFD slot to a downlink SBFD slot, switching from uplink TDD to downlink SBFD within a mixed slot, switching from uplink SBFD to downlink TDD in a mixed slot, switching from uplink TDD to downlink TDD, or any combination thereof.

Aspect 31: The method of any of aspects 27 through 30, wherein the first count of supported switching events is associated with switching from a downlink SBFD slot to an uplink SBFD slot, switching from downlink TDD to uplink SBFD within a mixed slot, switching from downlink SBFD to uplink TDD in a mixed slot, switching from downlink TDD to uplink TDD, or any combination thereof.

Aspect 32: The method of any of aspects 19 through 31, wherein obtaining the indication of the capability further comprises: obtaining an indication of a zero value corresponding to the threshold quantity of switching events supported by the UE within the time period.

Aspect 33: The method of aspect 32, wherein outputting the scheduling comprises: outputting scheduling for a downlink message for communication during the time period; and refraining from outputting scheduling for an uplink message for communication during the time period based at least in part on receiving the indication of the zero value.

Aspect 34: The method of any of aspects 32 through 33, wherein the one or more messages scheduled for communication during the time period comprise a downlink message and an uplink message, and wherein the communicating comprises: obtaining the uplink message; and outputting the downlink message after outputting the uplink message based at least in part on an absence of a guard period associated with the UE switching from operating in the transmission mode to operating in the reception mode.

Aspect 35: A UE for wireless communications, comprising one or more memories storing processor-executable code, and one or more processors coupled with the one or more memories and individually or collectively operable to execute the code to cause the UE to perform a method of any of aspects 1 through 18.

Aspect 36: A UE for wireless communications, comprising at least one means for performing a method of any of aspects 1 through 18.

Aspect 37: A non-transitory computer-readable medium storing code for wireless communications, the code comprising instructions executable by one or more processors to perform a method of any of aspects 1 through 18.

Aspect 38: A network entity for wireless communications, comprising one or more memories storing processor-executable code, and one or more processors coupled with the one or more memories and individually or collectively operable to execute the code to cause the network entity to perform a method of any of aspects 19 through 34.

Aspect 39: A network entity for wireless communications, comprising at least one means for performing a method of any of aspects 19 through 34.

Aspect 40: A non-transitory computer-readable medium storing code for wireless communications, the code comprising instructions executable by one or more processors to perform a method of any of aspects 19 through 34.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more processors; and
one or more memories coupled with the one or more processors, with instructions stored in the one or more memories, the instructions being executable by the one or more processors, individually or in any combination, to cause the UE to:
transmit an indication of a capability of the UE, the capability associated with a threshold quantity of switching events supported by the UE within a time period comprising one or more sub-band full duplex slots, wherein the switching events correspond to the UE switching between operating in a reception mode and operating in a transmission mode;
receive scheduling for one or more messages, the one or more messages scheduled for communication during the time period in accordance with the capability of the UE; and communicate the one or more messages with a network entity based at least in part on receiving the scheduling.

2. The UE of claim 1, wherein a quantity of switching events for the scheduled one or more messages comprises less than or equal to the threshold quantity of switching events based at least in part on transmitting the indication of the capability.

3. The UE of claim 1, wherein the time period corresponds to a sub-band full duplex pattern comprising the one or more sub-band full duplex slots and one or more sub-band full duplex symbols.

4. The UE of claim 1, wherein the capability is associated with a second threshold quantity of switching events supported by the UE within each sub-band full duplex slot of the time period.

5. The UE of claim 4, wherein, to transmit the indication of the capability, the one or more processors are individually or collectively further operable to execute the instructions to cause the UE to:

transmit an indication of a non-zero value corresponding to the threshold quantity of switching events supported by the UE within the time period and an indication of a zero value corresponding to the second threshold quantity of switching events supported by the UE within each sub-band full duplex slot based at least in part on switching events being supported by the UE between sub-band full duplex slots.

6. The UE of claim 1, wherein the time period comprises a time division duplex downlink-uplink pattern comprising the one or more sub-band full duplex slots and one or more time division duplex slots and one or more slots having sub-band full duplex symbols and non-sub-band full duplex symbols.

7. The UE of claim 1, wherein the time period comprises a mixed slot having one or more sub-band full duplex symbols and one or more time division duplex symbols.

8. The UE of claim 1, wherein the time period corresponds to one sub-band full duplex slot.

9. The UE of claim 1, wherein a quantity of switching events for the scheduled one or more messages comprises a first count of supported switching events corresponding to the UE switching from operating in the reception mode to operating in the transmission mode, the quantity of switching events satisfying the threshold quantity of switching events.

10. The UE of claim 9, wherein the quantity of switching events for the scheduled one or more messages further comprises a second count of supported switching events corresponding to the UE switching from operating in the transmission mode to operating in the reception mode.

11. The UE of claim 10, wherein the capability of the UE is associated with a guard period for switching from operating in the transmission mode to operating in the reception mode, and wherein the threshold quantity of switching events comprises the second count of supported switching events based at least in part on the capability of the UE requesting the guard period.

12. The UE of claim 10, wherein the second count of supported switching events is associated with switching from the transmission mode for an uplink sub-band full duplex symbol to the reception mode for a downlink sub-band of a full duplex symbol, switching from the transmission mode for an uplink time division duplex symbol to the reception mode for a downlink sub-band of a full duplex symbol within a mixed slot, switching from the transmission mode for an uplink sub-band full duplex symbol to the reception mode for a downlink time division duplex symbol in a mixed slot, switching from the transmission mode for an uplink time division duplex symbol to the reception mode for a downlink time division duplex symbol, or any combination thereof.

13. The UE of claim 9, wherein the first count of supported switching events is associated with switching from the reception mode for a downlink sub-band full duplex symbol to the transmission mode for an uplink sub-band full duplex symbol, switching from the reception mode for a downlink time division duplex symbol to the transmission mode for an uplink sub-band full duplex symbol within a mixed slot, switching from the reception mode for a downlink sub-band full duplex symbol to the transmission mode for an uplink time division duplex symbol in a mixed slot, switching from the reception mode for a downlink time division duplex symbol to the transmission mode for an uplink time division duplex symbol, or any combination thereof.

14. The UE of claim 1, wherein, to transmit the indication of the capability, the one or more processors are individually or collectively further operable to execute the instructions to cause the UE to:

transmit an indication of a zero value corresponding to the threshold quantity of switching events supported by the UE within the time period.

15. The UE of claim 14, wherein, to communicate, the one or more processors are individually or collectively operable to execute the instructions to cause the UE to:

receive a downlink message during the time period; and refrain from transmitting an uplink message during the time period based at least in part on transmitting the indication of the zero value.

16. The UE of claim 14, wherein, to communicate, the one or more processors are individually or collectively operable to execute the instructions to cause the UE to:

transmit an uplink message; and receive a downlink message after transmitting the uplink message based at least in part on an absence of a guard period associated with the UE switching from operating in the transmission mode to operating in the reception mode.

17. The UE of claim 14, wherein, to communicate the one or more messages, the one or more processors are individually or collectively operable to execute the instructions to cause the UE to:

receive a downlink control information message scheduling an uplink message within the time period.

18. The UE of claim 17, wherein the one or more processors are individually or collectively further operable to execute the instructions to cause the UE to:

transmit the uplink message based at least in part on receiving the downlink control information message; and refrain from receiving a downlink message of the one or more messages based at least in part on transmitting the indication of the zero value and transmitting the uplink message.

19. A network entity, comprising:

one or more processors; and one or more memories coupled with the one or more processors, with instructions stored in the one or more memories, the instructions being executable by the one or more processors, individually or in any combination, to cause the network entity to:

obtain an indication of a capability of a user equipment (UE), the capability associated with a threshold quantity of switching events supported by the UE within a time period comprising one or more sub-band full duplex slots, wherein the switching events correspond to the UE switching between operating in a reception mode and operating in a transmission mode;

output scheduling for one or more messages to the UE, the one or more messages scheduled for communication during the time period in accordance with the capability of the UE; and communicate the one or more messages with the UE based at least in part on transmitting the scheduling.

20. The network entity of claim 19, wherein a quantity of switching events for the scheduled one or more messages is less than or equal to the threshold quantity of switching events based at least in part on transmitting the indication of the capability.

21. The network entity of claim 19, wherein the time period corresponds to a sub-band full duplex pattern comprising the one or more sub-band full duplex slots and one or more sub-band full duplex symbols.

22. The network entity of claim 19, wherein the capability is associated with a second threshold quantity of switching events supported by the UE within each sub-band full duplex slot of the time period.

23. The network entity of claim 22, wherein, to obtain the indication of the capability, the one or more processors are individually or collectively further operable to execute the instructions to cause the network entity to:

obtain an indication of a non-zero value corresponding to the threshold quantity of switching events supported by the UE within the time period and an indication of a zero value corresponding to the second threshold quantity of switching events supported by the UE within each sub-band full duplex slot based at least in part on switching events being supported by the UE between sub-band full duplex slots.

24. The network entity of claim 19, wherein the time period comprises a time division duplex downlink-uplink pattern comprising the one or more sub-band full duplex slots and one or more time division duplex slots and one or more slots having sub-band full duplex symbols and non-sub-band full duplex symbols.

25. The network entity of claim 19, wherein the time period comprises a mixed slot having one or more sub-band full duplex symbols and one or more time division duplex symbols.

26. The network entity of claim 19, wherein the time period corresponds to one sub-band full duplex slot.

27. The network entity of claim 19, wherein a quantity of switching events for the scheduled one or more messages comprises a first count of supported switching events corresponding to the UE switching from operating in the reception mode to operating in the transmission mode.

28. The network entity of claim 27, wherein the quantity of switching events for the scheduled one or more messages further comprises a second count of supported switching events corresponding to the UE switching from operating in the transmission mode to operating in the reception mode.

29. A method for wireless communications by a user equipment (UE), comprising:

transmitting an indication of a capability of the UE, the capability associated with a threshold quantity of switching events supported by the UE within a time period comprising one or more sub-band full duplex slots, wherein the switching events correspond to the UE switching between operating in a reception mode and operating in a transmission mode;

receiving scheduling for one or more messages, the one or more messages scheduled for communication during the time period in accordance with the capability of the UE; and communicating the one or more messages with a network entity based at least in part on receiving the scheduling.

30. A method for wireless communications by a network entity, comprising:

obtaining an indication of a capability of a user equipment (UE), the capability associated with a threshold quantity of switching events supported by the UE within a time period comprising one or more sub-band full duplex slots, wherein the switching events correspond to the UE switching between operating in a reception mode and operating in a transmission mode;

outputting scheduling for one or more messages to the UE, the one or more messages scheduled for communication during the time period in accordance with the capability of the UE; and communicating the one or more messages with the UE based at least in part on transmitting the scheduling.

* * * * *